INVENTOR.
MARVIN CAMRAS
BY
ATTORNEYS

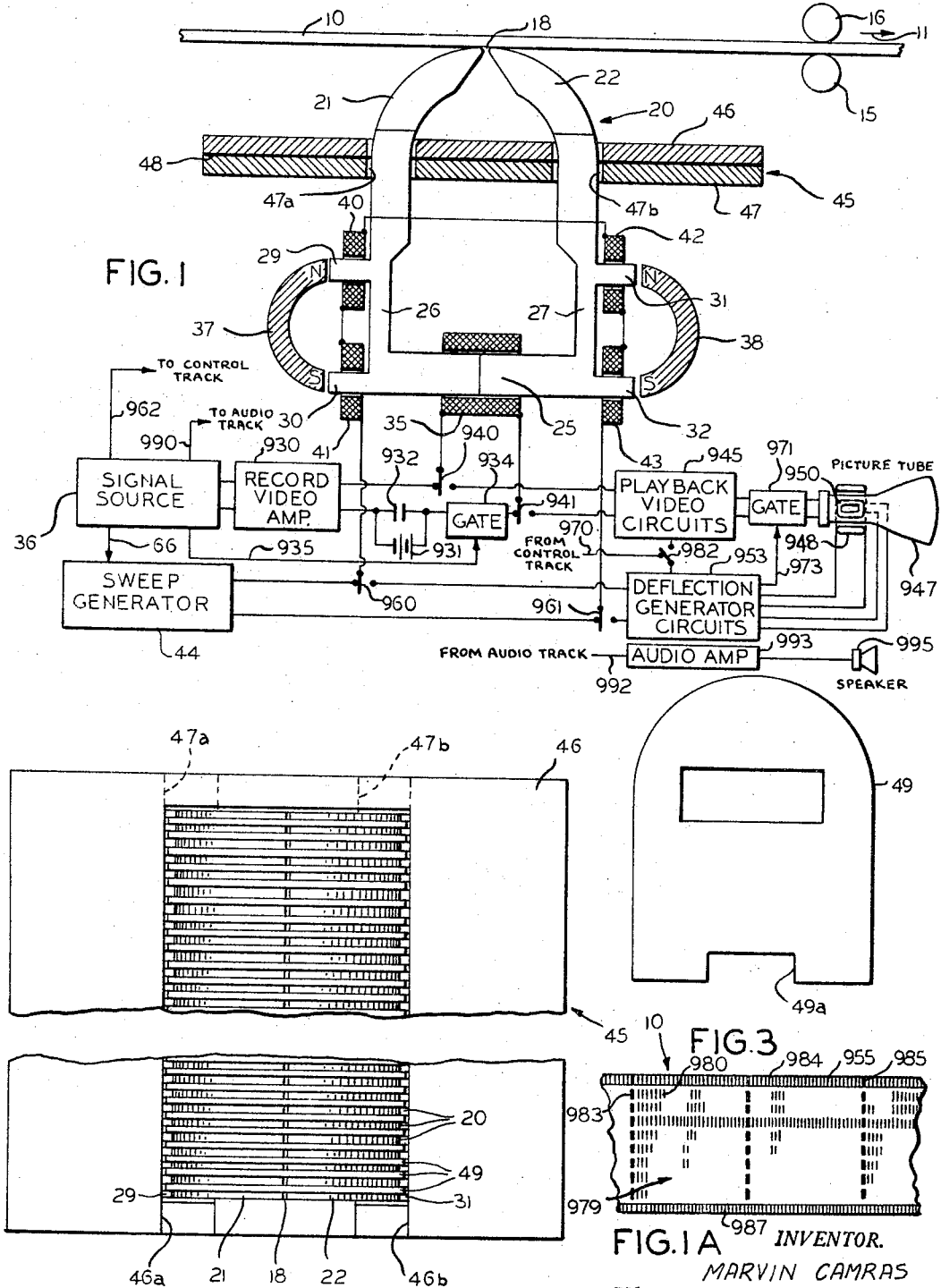

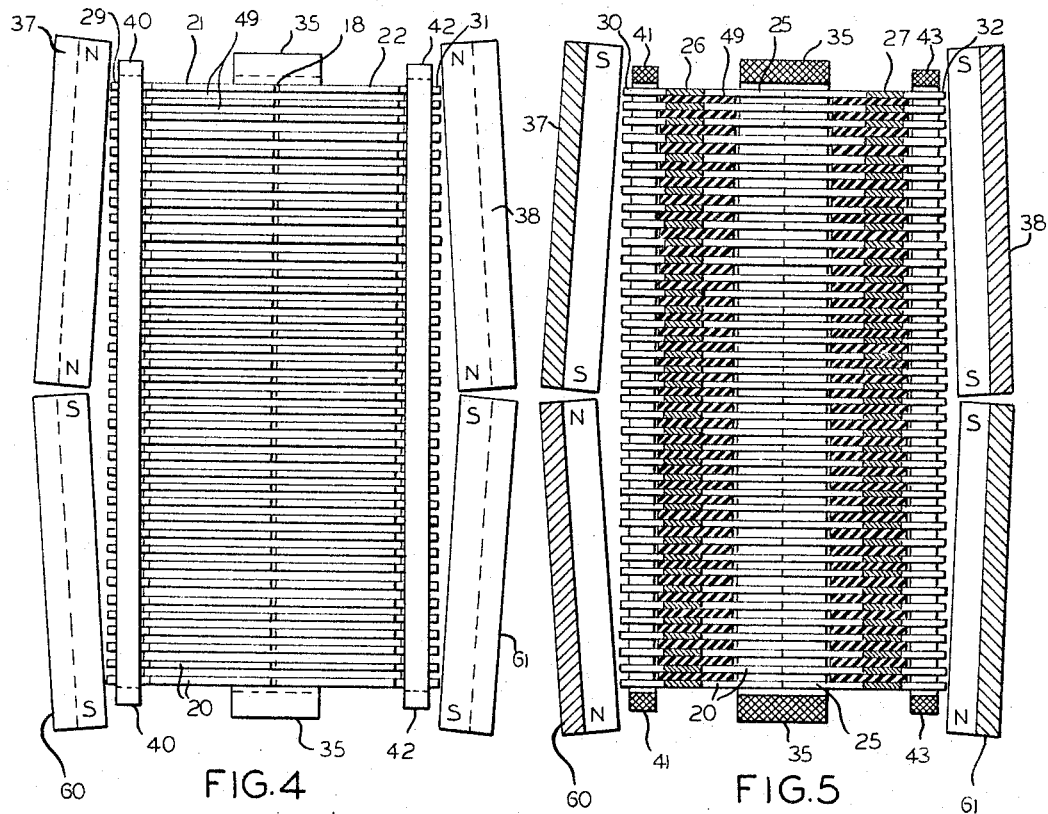
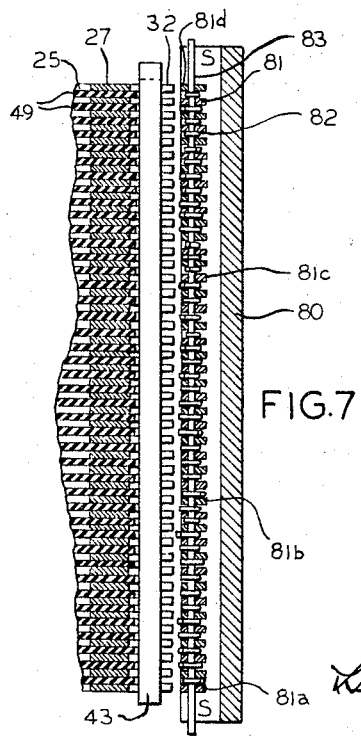
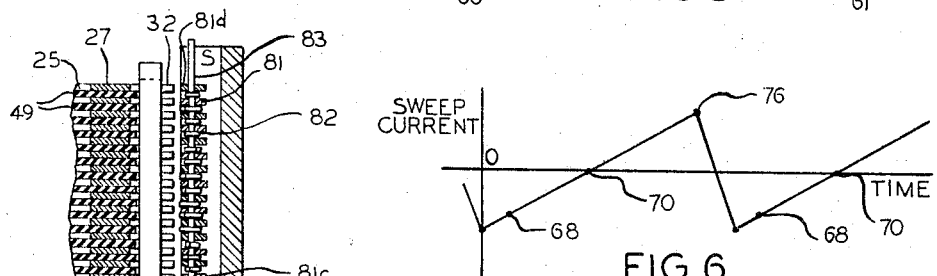
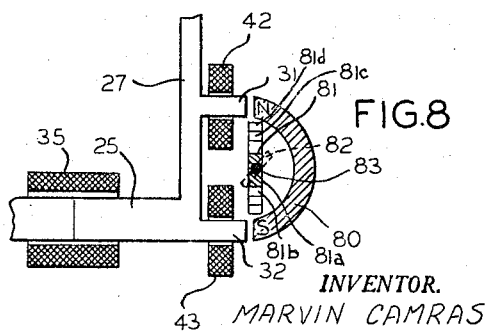

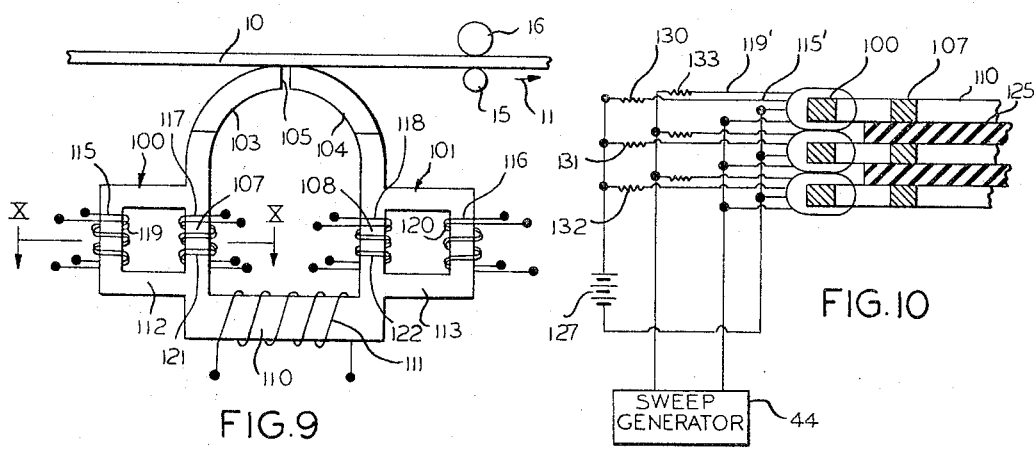
FIG.9
FIG.10
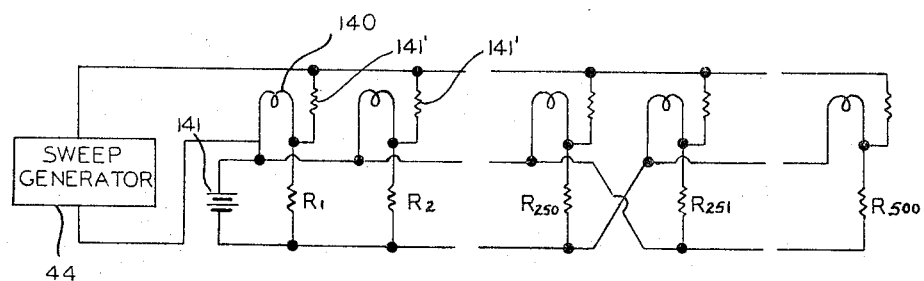
FIG.11
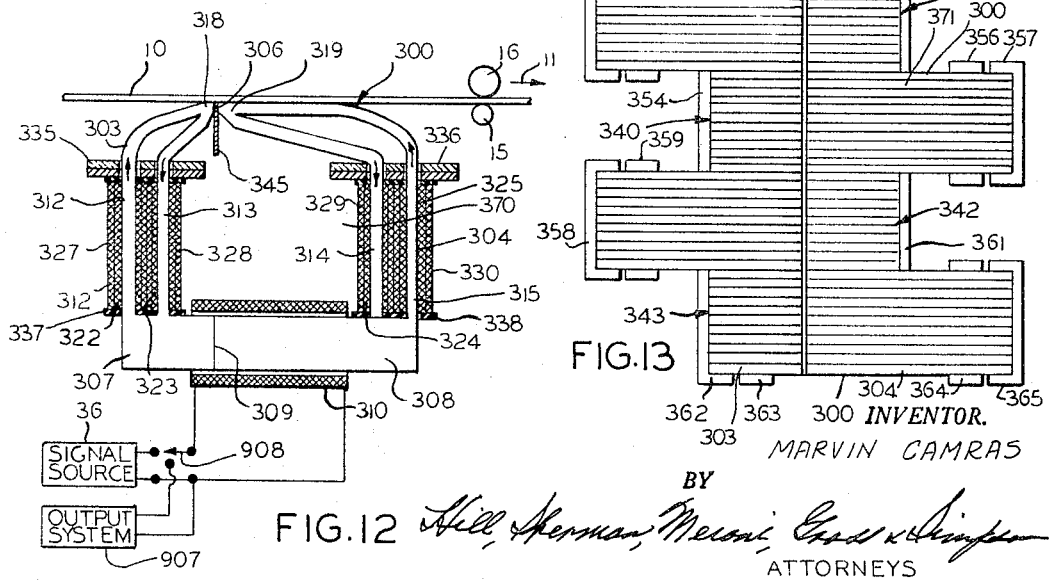
FIG.12
FIG.13
INVENTOR.
MARVIN CAMRAS
BY
ATTORNEYS May 7, 1968   M. CAMRAS   3,382,325
MAGNETIC TRANSDUCER SYSTEM
Filed Aug. 20, 1959   7 Sheets-Sheet 5

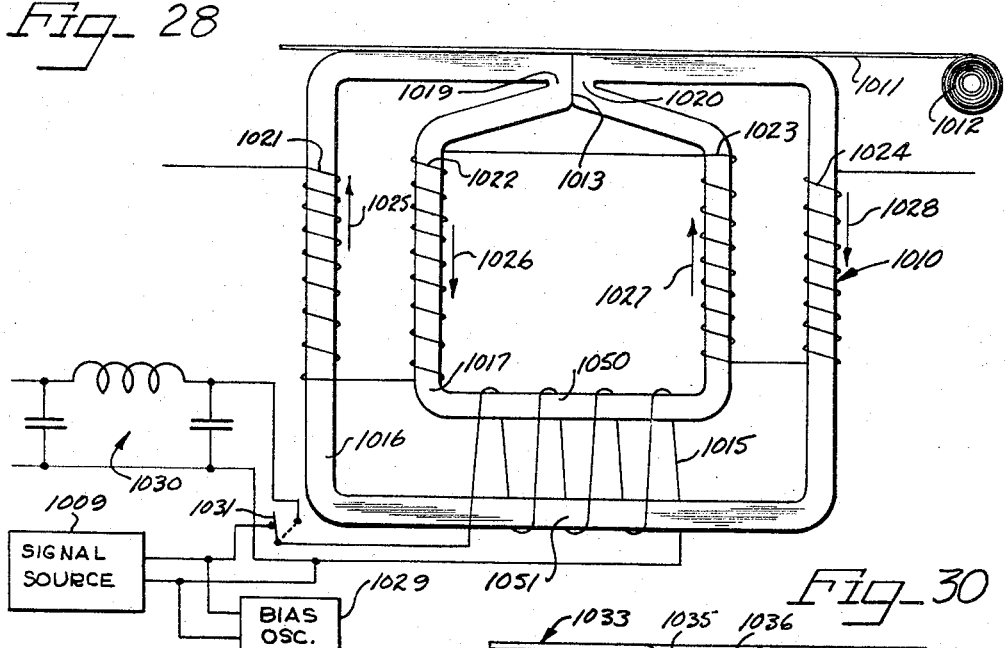

United States Patent Office 3,382,325
Patented May 7, 1968

3,382,325
MAGNETIC TRANSDUCER SYSTEM
Marvin Camras, Glencoe, Ill., assignor to IIT Research Institute, a corporation of Illinois
Continuation-in-part of application Ser. No. 415,811, Mar. 12, 1954. This application Aug. 20, 1959, Ser. No. 835,017
38 Claims. (Cl. 179—100.2)

This application is a continuation-in-part of my copending application Ser. No. 415,811, filed Mar. 12, 1954 and now abandoned.

This invention relates to a magnetic recording and reproducing system and particularly to such a system for recording and reproducing over an area of a magnetic record medium.

An important aspect of the present invention resides in the concept of providing magnetic signal flux paths between a record medium and a signal transducing winding or the like which are saturated to block the signal flux paths except when a desaturating signal of predetermined characteristics is applied. By way of example, a desaturating signal of different amplitude may be required for each path, so that a desaturating signal of saw-tooth waveform fed to all of the flux paths simultaneously will activate said flux paths in succession. In recording, a signal to be recorded may be applied to a signal winding common to all of the signal flux paths and the signal flux paths may be activated in succession to record the signal over an area of the record medium. In playback, the flux paths are successively desaturated in the same order to scan the recorded area on the record medium and reproduce the recorded signal. Preferably the signal flux paths are saturated by bias fluxes of successively different values and an opposing desaturating flux is swept through values to successively desaturate said flux paths when recording or reproducing over an area of a magnetic record medium. A step type desaturating flux of variable amplitude may be used to activate the flux paths selectively when using the system for distributing signals to different channels of a record medium in a selective non-sequential fashion.

The system has application to area and multichannel recording in general, and for example, has utility in high speed memories for computers, cameras for still or motion pictures on magnetic tape instead of photographic film, transverse scan recorders and the like as well as for devices for reading or playing such records.

It is therefore an important object of the present invention to provide a novel area recording and/or reproducing system for magnetic record media.

It is a further object of the invention to provide a novel recording and/or reproducing system particularly adapted to recording video signals on a magnetic record medium moving at relatively low speed.

A further object of the invention is to provide an area recording and/or reproducing head assembly utilizing no moving parts and requiring no complex electronic switching equipment.

Still another object of the invention is to provide a relatively rugged and reliable and relatively inexpensive area recording system.

Yet another object of the invention is to provide a magnetic transducer head adapted to multichannel operation and accommodating high speed electric selection of the desired channel.

Other objects, features and advantages of the present invention will be apparent from the following detailed description taken in connection with the accompanying drawings, in which:

FIGURE 1 is a somewhat diagrammatical vertical sectional view illustrating a head lamination unit of the transducer head assembly of the present invention and the associated circuitry;

FIGURE 1A illustrates diagrammatically a tape record produced by the head of FIGURE 1;

FIGURE 2 is a fragmentary somewhat diagrammatic top plan view of the head assembly of FIGURE 1;

FIGURE 3 is a side elevational view of a spacer lamination which is preferably of non-magnetic electrically conductive material such as copper;

FIGURE 4 is a somewhat diagrammatic top plan view of the head assembly of FIGURE 1 with the shield 45 omitted;

FIGURE 5 is a somewhat diagrammatic horizontal sectional view of the transducer head assembly of FIGURE 1;

FIGURE 6 is an illustration of the sweep current waveform as a function of time supplied by the sweep generator 44 in FIGURE 1;

FIGURE 7 is a fragmentary somewhat diagrammatic illustration of a modified transducer head assembly similar to that of FIGURE 1 but utilizing a series of permanent magnets having constant spacing from the head lamination units and utilizing a series of shunt elements to provide successively different bias fluxes to the successive head lamination units;

FIGURE 8 is a fragmentary somewhat diagrammatic vertical sectional view showing a portion of a head lamination unit and the associated permanent magnet and shunt elements for the head of FIGURE 7;

FIGURE 9 is a somewhat diagrammatic elevational view of a head lamination unit for a further embodiment of the present invention wherein the bias fluxes are supplies by means of electromagnets rather than permanent magnets;

FIGURE 10 is a somewhat diagrammatic fragmentary horizontal sectional view of the head of FIGURE 9 and illustrating the electric circuit associated with the head;

FIGURE 11 illustrates a further modification wherein a single winding such as indicated at 140 is substituted for bifilar windings such as 115 and 119 in FIGURE 9 and the sweep and bias currents are fed to the same winding but in opposing relation, the bias currents in the successive windings being adjusted to different values by means of suitable resistors;

FIGURE 12 illustrates a further embodiment of the present invention and shows in diagrammatic vertical cross section a head lamination unit having a series of graded bias turns, so that equal bias current produces different bias fluxes in the successive head lamination units;

FIGURE 13 is a diagrammatic plan view of a head assembly utilizing laminations as illustrated in FIGURE 12 stacked to provide a straight line series of gaps, but with the windings of successive groups of laminations being offset from each other to accommodate closer spacing of the adjacent groups of laminations;

Figure 19:
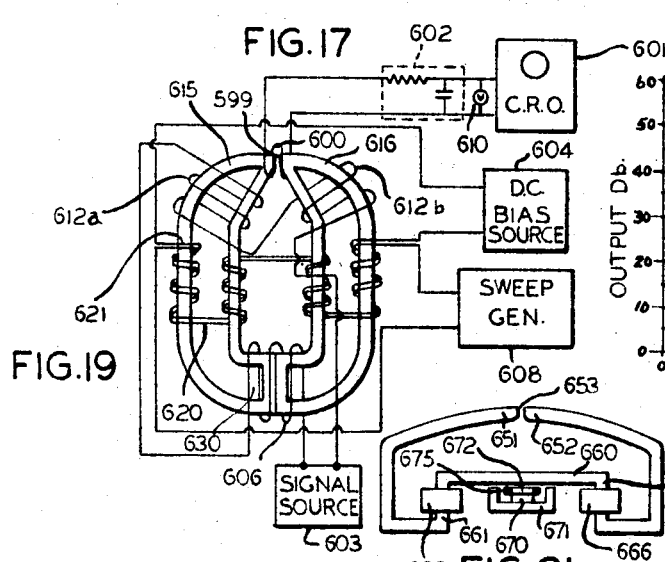
FIGURE 19 illustrates the electric circuit arrangement for the head of FIGURE 18.
Figure 20:
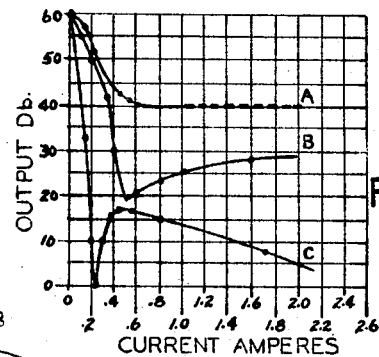
Figure 21:
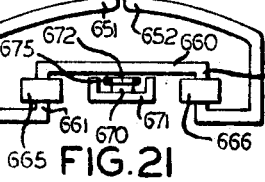
Figure 22:
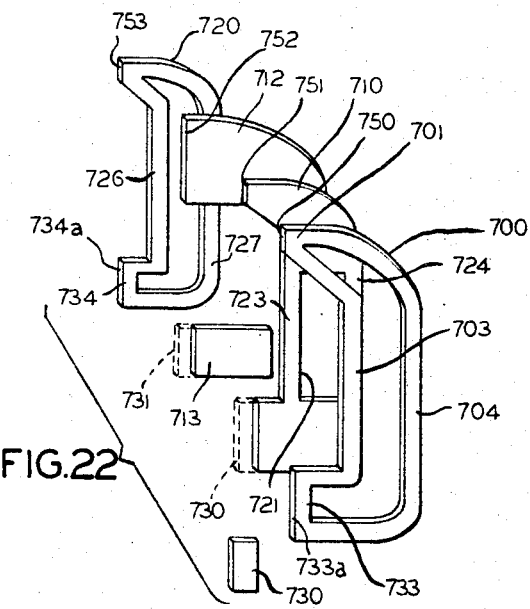
Figure 23:
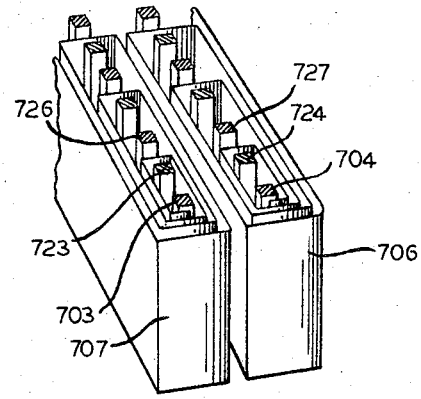
Figure 26:
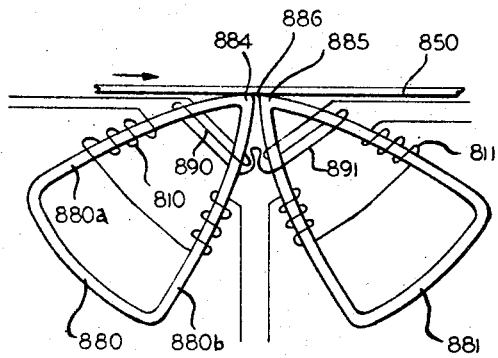
Figure 24:
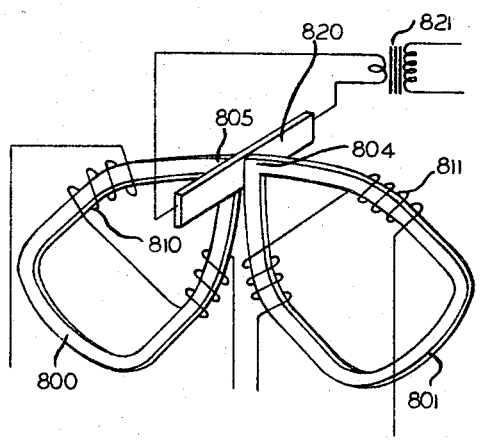
Figure 25:
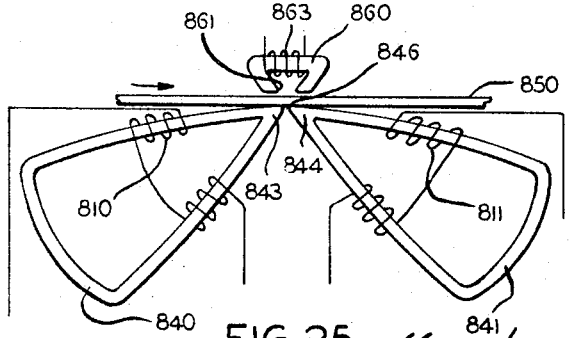

FIGURE 20 is a plot of output at the oscilloscope for head configurations generally as shown in FIGURE 19 as a function of direct current through the bias windings, and without compensating turns (curve A), with compensating turns around a non-saturable portion of the core (curve B) and with compensating turns wound about a region which saturates with increasing bias (curve C), it being noted that the various curves were obtained using lamination configurations which were slightly different from each other;

FIGURE 21 illustrates a further embodiment wherein the successive laminations have the signal winding split into two parts and the saturating bias and sweep elements are located at the base of the lamination between the signal winding sections;

FIGURE 22 is a somewhat diagrammatic perspective view illustrating a series of head lamination units with suitable spacer means therebetween for one side of a head assembly;

FIGURE 23 is a diagrammatic perspective view indicating a ribbon type graded winding wound on a series of legs of head lamination units corresponding to the embodiment of FIGURE 22;

FIGURE 24 illustrates a relatively symmetrical head lamination unit comprising a pair of relatively symmetrical loop magnetic paths and wherein the signal is introduced at the gap by means of a conductor extending through the gap between the head sections of all the lamination units;

FIGURE 25 illustrates a relatively symmetrical head configuration similar to FIGURE 24 but with the signal introduced by means of a core on the opposite side of the record medium from the head lamination units and extending over the entire series of head lamination units in a preferred embodiment;

FIGURE 26 illustrates a further symmetrical head lamination configuration in which the signal is introduced by means of a winding on the lamination near the gap;

FIGURE 27 is a graph of permeability as a function of applied field intensity for various magnetic materials;

FIGURE 28 is a diagrammatic side elevational view of one embodiment of an electromagnetic transducer head assembly which is continuously demagnetized during operation;

FIGURE 29 is a diagrammatic side elevational view of a second embodiment of an electromagnetic transducer head which is continuously demagnetized;

FIGURE 30 is a diagrammatic top plan view of the structure of FIG. 29;

FIGURE 31 is a diagrammatic end elevational view of the structure of FIG. 29; and FIGURE 32 is a representative plot of permeability vs. flux density in the cores of FIGS. 28 and 29.

FIGURE 1 illustrates a first embodiment of the present invention wherein a relatively wide record medium 10 is moved in the direction of the arrow 11 by means of a constant speed drive means including a capstan 15 and pressure roll 16. Preferably, the tape cooperates with a series of head units having gaps such as indicated at 18 which are aligned at right angles to the direction of travel of the tape. Each head unit or lamination 20 may comprise a pair of pole pieces 21 and 22 defining the gap 18 and receiving a portion of the width of the tape in sliding contact thereto. The pole pieces 21 and 22 may be removable and replaceable in the event of wear, preferably as a multiple assembly of poles such as 21, 22 with gap spacers therebetween in gaps 18.

Each head lamination may further comprise a base leg 25 and a pair of small cross section portions 26 and 27 connecting the ends of the base 25 with the respective pole pieces 21 and 22. The head lamination may have right angle extensions 29 and 30, and 31 and 32 which may, for example, be integral with parts 26 and 27, respectively, of the lamination. The laminations may be of nickel iron alloy, which is ordinarily extremely high in magnetic permeability; but which can be saturated so that its permeability drops to a low value. Preferably the base legs 25 of the head lamination units are substantially aligned and of similar size to receive a signal winding 35 which extends about all the base legs 25 in common so that each lamination unit receives a substantially identical magnetomotive force corresponding to the signal from signal source 36, FIGURE 1, at each instant of time.

The core portions 26 and 27 are normally biased to a saturation condition by means of permanent magnets 37 and 38 so that the portions 26 and 27 present a relatively high reluctance to signal flux introduced into the core by the winding 35. As a consequence, under normal conditions an insufficient signal flux reaches the gap 18 to produce an effective recording on the record medium 10. It will be observed that the flux path from the bias magnets 37 and 38 extends in series through the extensions 29 and 30, and 31 and 32, respectively, and that the extensions have individual windings 40, 41, 42 and 43 thereon. These windings are operative at a particular value of current supplied from a sweep generator 44, FIGURE 1, to sufficiently oppose the bias fluxes from the bias magnets 37 and 38 as to remove the saturation condition of the portions 26 and 27, whereupon a signal flux appears at the gap 18 of sufficient magnitude to produce a corresponding magnetization of the record medium 10.

The saturating magnets 37 and 38 appear to be more effective in controlling the amount of signal flux from winding 35 which reaches gap 18 if the saturable portions 26 and 27 and extensions 29–32 are placed adjacent the base leg 25 as shown in FIGURE 1.

It has been found to be highly advantageous to place a magnetic shield 45 between the signal winding 35 and the gaps 18. The shield may comprise overlapping laminations 46 and 47 of high permeability magnetic material. As seen in FIGURE 2 the shields may be of E shape with gaps 46a and 46b between the free ends of the legs of lamination 46 at one end of the head assembly and with gaps 47a and 47b between the free ends of the legs of lamination 47 at the opposite end of the head assembly. The laminations may have a thin sheet 48 of insulating material therebetween so that the gaps 46a, 46b, 47a, 47b prevent electrical short circuit paths about the magnetic core parts of the head units 20.

FIGURE 3 illustrates a shield member 49 which is preferably of electrically conductive non-magnetic material such as copper and which may be interposed between the successive head laminations 20 as best seen in FIGURE 4. It will be observed that the shield member has a slot 49a for accommodating the winding 35 so that the winding 35 may extend through the successive magnetic head laminations above the successive base legs 25 and through the successive slots 49a of the shield members interposed between the successive head laminations. As seen in FIGURE 4, the windings 40, 41, 42 and 43 encircle the respective extensions 29–32 of each of the head laminations so as to provide the same sweep generator magnetomotive force to the extensions of each head lamination. The conditions are such, however, that only one head lamination will be enabled to provide a recording signal flux at its gap at a given instant of time. For example, magnets 37 and 38 may have successively different length gaps between the pole faces of the magnets and the ends of extensions 29–32 of the respective head lamination units as shown in FIGURES 4 and 5. Thus, while each of the saturable portions 26 and 27 of the head lamination units may be saturated in the initial condition of the sweep generator, the magnetomotive force supplied to the extensions of the successive head units by the magnets 37, 38 will have successive different values. As indicated in FIGURE 5, the magnets 37 and 38 may extend only over half the length of the head assembly with magnets 60 and 61 of opposite polarity orientation as compared to the magnets 37 and 38 extending along the other half of the assembly at an angle to the head lamination units so as to provide progressively decreasing gaps between the permanent magnet units and the head lamination extensions. Alternatively, only a single pair of permanent magnet units such as 37 and 38 may be employed over the entire length of the head assembly with the gaps progressively increasing over the entire length of the assembly.

The sweep generator 44 will, for example, produce a saw-tooth type current wave form which progressively increases the magnetomotive force generated by the windings 40–43 over a period of time which may, for example, correspond to the line frequency of a video signal from signal source 36. The sweep generator 44 may be synchronized with the video line rate by means diagrammatically represented by the line 66 in FIGURE 1 which may serve to feed a synchronizing pulse to the sweep generator from the signal source at the line rate to maintain the sweep generator 44 in step with the video signal. The invention is, of course, not restricted to recording and playback of video signals, and may be used for area recording of any kind. For example, in recording pulses corresponding to binary digits of a computer, a desired channel may be selected by energizing windings 40–43 with the corresponding current at the time a suitable pulse is being supplied to winding 35.

For the embodiment illustrated in FIGURE 5, where magnets of opposite polarity are used in addition to the varying gap length between the magnets and the head laminations, the sweep current generated by sweep generator 44 will be of the form illustrated in FIGURE 6 where the current is initially at a negative maximum and progressively decreases to zero and then increases to a positive maximum, and then drops back to the negative maximum after which the cycle is repeated. With the sweep current at a value corresponding to point 68 in FIGURE 6, just above the negative maximum value, the magnetomotive force exerted by the portion of the permanent magnets 37, 38 at the first head lamination (at the top in FIGURE 4) may be exactly compensated for or bucked out so that the magnetic circuit of the first head lamination, being of high permeability, presents a low reluctance path to gap 18 thereof and enables recording of the instantaneous value of the video or other signal energizing winding 35 by the first head lamination. At a further instant of time, the sweep current may be of further reduced negative amplitude so as to exactly balance the magnetomotive force exerted by the magnets 37 and 38 at the second head lamination in FIGURE 4, whereupon the second head lamination will provide a low reluctance circuit for signal flux which will then produce a recording on the tape 10 at a second position across its width. At the point of zero sweep current indicated at 70 in FIGURE 6, the permanent magnets 37, 38, 60, 61 will be effective to saturate all of the head laminations except one centrally of the assembly where the permanent magnets of opposite polarity substantially balance each other, and in the absence of current in the windings 40–43, fail to exert a saturating effect on the corresponding saturating portions 26, 27 of the lamination. As the sweep current increases in the positive direction, successive head laminations associated with the permanent magnets 60, 61 will be activated until the final lamination is activated at the end point of the sweep corresponding to a positive maximum and designated by the point 76 in FIGURE 6.

When magnets 37, 38 and 60, 61 terminate abruptly at the ends of the head assembly, the bias magnetic field supplied by the magnets to the end head laminations may not be linearly related to the bias fields supplied to the other head laminations, because of fringing effects and the like. This may be compensated, or the magnets may purposely be made longer than the head assembly to extend substantially beyond the end head laminations as shown in FIGURES 4 and 5. A few dummy laminations may be added at each end of the head to keep fringing and similar effects from affecting the active head units.

By way of example, if there are 500 laminations and the tape 10 has a width of two inches, the head laminations may each have a thickness of two mils (1 mil equal .001 inch), and the shield laminations 49 may also have a two mil thickness. By way of example, the saturable portions such as 26 and 27 of each head lamination may be of a magnetic material which will change from positive to negative saturation for a change in applied field of 0.5 oersted. There are a number of saturable high permeability materials which can meet this requirement. The sweep current would then produce an effective change in magnetizing force from plus 125 oersteds to minus 125 oersteds in order to successively activate each of the 500 lamination assemblies in succession in each cycle of the sweep generator. Examples of suitable materials are a magnetic material having a composition of 45% nickel and the remainder iron and impurities known as "45 Permalloy"; a 79% nickel, 4% molybdenum, balance iron, etc. alloy known as "4–79 Permalloy"; a related alloy known as "Supermalloy"; and a material having a composition of 50% nickel and the remainder iron and minor constituents known as "Deltamax."

It is highly advantageous to use bias of respective opposite polarities as indicated in FIGURES 4 and 5 since this reduces by one-half the absolute magnitude of the maximum values of sweep current required, reducing the heating effect by a factor of four.

FIGURES 7 and 8 illustrate a modification of the embodiment of FIGURE 5 wherein the bias magnets at each side of the head assembly such as indicated at 80 have their poles spaced at a constant distance from the ends of the extensions such as 31 and 32 and shunt armature elements 81 are provided as indicated in FIGURE 8 of successively different height so as to provide a different bias field for each of the head laminations from the permanent magnet assemblies. In FIGURE 8, only a few of the shunt elements are shown, for convenience of illustration, and there would be a large number of additional shunt elements of progressively increasing size between each of the successively larger elements 81a, 81b 81c and 81d shown in FIGURE 8. The shunt elements are shown only diagrammatically in FIGURE 7 and in practice each would preferably be aligned with a respective one of the head laminations. By way of example, the shunt armature elements may provide a sufficiently different effective shunt reluctance at the successive head laminations so as to provide a change of .5 oersted in the magnetizing force exerted on the successive head laminations.

As an alternative embodiment, bias magnets of reverse polarity may be provided in conjunction with respective groups of head laminations by analogy with FIGURES 4 and 5. In this case for 500 head laminations, and a change in permanent magnet bias between successive head laminations of 0.5 oersted, the sweep current must generate a magnetizing force varying between minus 125 oersteds and plus 125 oersteds as in the preceding embodiments. The operation and other constructional details of the embodiment of FIGURES 7 and 8 are similar to those of FIGURES 1, 2, 3, 4 and 5, so that further description thereof is deemed unnecessary.

Trimmer elements such as indicated at 82 in FIGURES 7 and 8 are preferably provided in addition to shunt elements 81 and the trimmer elements are individually adjustable so that they may be set to trim and balance the individual portions of the head when "tuning" it up. Such trimmers may also be used in conjunction with the other heads described herein for adjusting their operation. As shown, each element 82 is individually rotatable and/ or axially slidable on a mounting shaft 83 and is held in a selected position by frictional forces resulting from the tight fit of the shaft 83 in the circular apertures of elements 82. The shaft 83 may be mounted in a fixed angular orientation and axial position by suitable nonmagnetic supports.

It will be understood that in the embodiments of FIGURES 1 through 8, magnetic cores of soft magnetic material may be substituted for the permanent magnets such as 37, 38, 60, 61 and 80 and magnetizing windings placed thereon of polarity to provide an equivalent for the permanent magnets indicated. The structure and operation of the embodiments would be otherwise identical, and either a progressive spacing of the pole faces of the electromagnets from the head laminations as in FIGURES 4 and 5, or a magnetic armature providing shunt paths of progressively varying reluctance as in FIGURE 7 may provide the progressively different bias fields from the electromagnets.

In further embodiment of the present invention as illustrated in FIGURES 9 and 10, individual electromagnets such as indicated at 100 and 101 may be associated with the individual head laminations including pole pieces 103 and 104 defining a gap 105 and having saturating leg portions 107 and 108 and a base leg 110 having a signal winding 111 common to all of the base legs of the head lamination units as in the preceding embodiments.

If side core portions 112 and 113 of electromagnets 100 and 101 are integral with saturating leg portions 107 and 108, as shown in FIGURE 9, without any gap in the local magnetic circuits, a comparatively low current in the windings 115 and 117, and 116 and 118 will produce a very large circulating flux sufficient to saturate leg portions 107 and 108. Much higher currents are needed if even a minute gap is present in these local magnetic circuits.

In this embodiment, a different bias field may be applied to each of the head laminations by providing a different bias current in respective bias windings such as indicated at 115 and 117. Sweep windings 119 and 121, and 120 and 122 may be bifilar wound with the bias windings 115 and 117, and 116 and 118, respectively, of each head lamination unit so as to provide practically complete neutralization of the magnetomotive forces of the bias windings at the corresponding values of sweep current. Alternatively, very closely adjacent windings may be provided for the bias and sweep currents.

Referring to FIGURE 10, the successive head laminations may have suitable shielding means preferably comprising non-magnetic electrically conductive laminations 125 interposed therebetween. The bias windings of the respective head lamination units may receive different bias currents from the bias voltage source indicated at 127 by interposing resistors of differing values such as indicated at 130, 131 and 132 in series with the successive winding leads such as 115' for windings 115 on the respective head lamination units. The sweep generator 44 having the output shown in FIGURE 6 may be connected to each of the sweep winding leads, such as 119' for winding 119, in parallel, for example, through resistors such as 133 of equal value so that the same sweep magnetomotive force is applied to all of the head laminations at each instant of time. As in the preceding embodiments, the successive bias fields may differ by a predetermined value, for example 0.5 oersted, and the sweep generator may sweep its windings through magnetizing forces from minus 125 oersteds to plus 125 oersteds, for example, as in the preceding embodiments. Thus, each head lamination unit will be rendered operative in succession to record a line of video signal, for example, as a line across the width of the tape.

In general, the control windings of the head assembly such as 115, 116, 119 and 120 are fed by sources of high internal impedance such that there is substantially no interaction or cross coupling between the individual head lamination units due to voltages induced in the common windings or common circuits.

FIGURE 11 illustrates an embodiment similar to that of FIGURES 9 and 10, except that single windings such as indicated at 140 are provided on each of the electromagnets 100 and 101 in place of each set of bifilar windings such as 115, 119. These single windings each receive a bias current from a bias supply indicated at 141. The windings of each head unit have a resistance element associated therewith $R_1$–$R_{500}$ of different value to provide a different bias field in each of the head lamination units. Each winding, such as 140, receives sweep current from sweep generator 44 and bias current from source 141, so that the bias current in the successive windings is successively neutralized by the sweep current as the sweep generator sweeps from a negative maximum current to a positive maximum current. Thus, if $R_1$ represents a minimum resistance, maximum negative current from the sweep generator will exactly cancel this maximum positive bias current at the initial instant of the cycle of the sweep generator to render the corresponding first head lamination of low reluctance with respect to the signal flux from the common signal winding corresponding to the winding 111 in FIGURE 9. The sweep current is fed to each of the windings through resistors 141' of equal resistance. Resistor $R_{250}$ will have a maximum resistance, so that as the sweep generator 44 approaches zero output current, a point will be reached where the bias current in the winding associated with the head lamination unit No. 250 will be exactly neutralized to render this head lamination active to record the instantaneous value of the video signal on the tape. An instant later, as the sweep generator current begins to increase in the positive direction, head lamination unit No. 251 will be rendered active if resistance $R_{251}$ is generally equal to resistance $R_{250}$. Similarly at the end of the sweep cycle, if resistance $R_{500}$ is a minimum generally equal to the resistance $R_1$, the last head lamination unit of the assembly will be rendered active at the end of the sweep cycle. The bias polarity is reversed between head laminations No. 250 and 251 as indicated in FIGURE 11.

FIGURE 12 illustrates a head lamination unit 300 for the multiple gap head assembly 301 of FIGURE 13. In the lamination unit of FIGURE 12, a pair of non-symmetrical core pieces 303 and 304 have confronting polar portions 318 and 319 defining a non-magnetic gap 306 for coupling to a magnetic record medium 10. The base leg portions 307 and 308 abut along a joint 309 and receive a signal winding 310 which is common at all the lamination units of the assembly of FIGURE 13.

The lamination assembly is provided with windows in the respective core portions to provide readily saturable leg portions 312, 313, 314 and 315 connected at their lower ends by the base portions 307 and 308 and connected at their upper ends by the pole portions 318 and 319. It has been found to be advantageous to extend the readily saturable leg portions 312–315 to a point closely adjacent the gap 306, since such a construction provides a more complete blockage of the signal flux from the gaps of the inactive head lamination units. It can be seen that the effect of extending the readily saturable leg portions from adjacent the base to adjacent the non-magnetic gap is to maximize the reluctance of the path from the signal coil 310 to the record medium 10 when the leg portions are saturated. Preferably each of the leg portions 312–315 receives bias windings such as indicated at 322, 323, 324 and 325 and sweep windings 327, 328, 329 and 330, so as to provide the maximum control of the reluctance of the saturable leg portions. Shielding means 335, 336, 337 and 338 of magnetic material providing high resistivity and low eddy current loss, such as a ferrite, are preferably disposed on opposite sides of the windings 322–325 and 327–330 to shunt any leakage fluxes which may exist between the bias and sweep windings on each leg when the bias and sweep fluxes are balanced in the legs themselves.

As illustrated in FIGURE 13, the lamination units such as 300 may be arranged in groups designated by the numbers 340, 341, 342 and 343. It will be understood that in the groups 340 and 343, the head lamination units are arranged in the orientation illustrated in FIGURE 12, while for the groups 341 and 342, the head lamination units are in an orientation which is a mirror image of the orientation shown in FIGURE 12. The gaps of all of the head lamination units defined by an integral gap spacer strip 345 are aligned in the direction at right angles to the direction of tape motion with the result that the windings such as 354, 356, and 357 of group 340 are offset laterally with respect to the windings such as 350, 351, 352 and 353 of group 341. It will be understood that if the head lamination unit 300 is one of the group 340, that the windings designated generally by the reference numeral 354 in FIGURE 13 will link leg 312 and will include bias winding 322 and sweep winding 327. Similarly the windings designated generally by the reference numeral 356 will correspond to windings 324 and 329 on leg 314 and the windings designated generally by the reference numeral 357 will correspond to windings 325 and 330 linking the leg 315. The windings such as 354 are so arranged as to fit into an area generally corresponding to area 370 in FIGURE 12 of the lamination units of group 341, and similarly the windings 352 and 353 of the lamination group 341 will fit into the area 370 of lamination units such as 300 of the group 340. The result is a much more compact spacing of the gaps such as 306 of the successive lamination units. As in the embodiment of FIGURES 1 through 6, the successive head lamination units such as 300 may have spacer plates 371 similar to the spacer plates 49 shown in FIGURES 2 and 3, except that the spacer plates would be split similarly to core parts 303 and 304, so that subassemblies including all core parts and spacer plate sections on one side of gap spacer 345 would be formed and mated with a subassembly including the remaining core parts and spacer plate sections to form the complete assembly. The spacer plate sections may have windows to accommodate the windings such as indicated at 350–365 in FIGURE 13 and may have notches similar to the notch 49a in FIGURE 3 for accommodating the signal winding 310. The spacer plate sections would also have additional windows to accommodate shields 335–338 and to accommodate the ends of windings 352 and 353, for example, where the spacer plates are part of the assembly 340. Suitable configurations of the spacer plates to accommodate the various windings will be apparent to those skilled in the art without further illustration.

Figure 14:
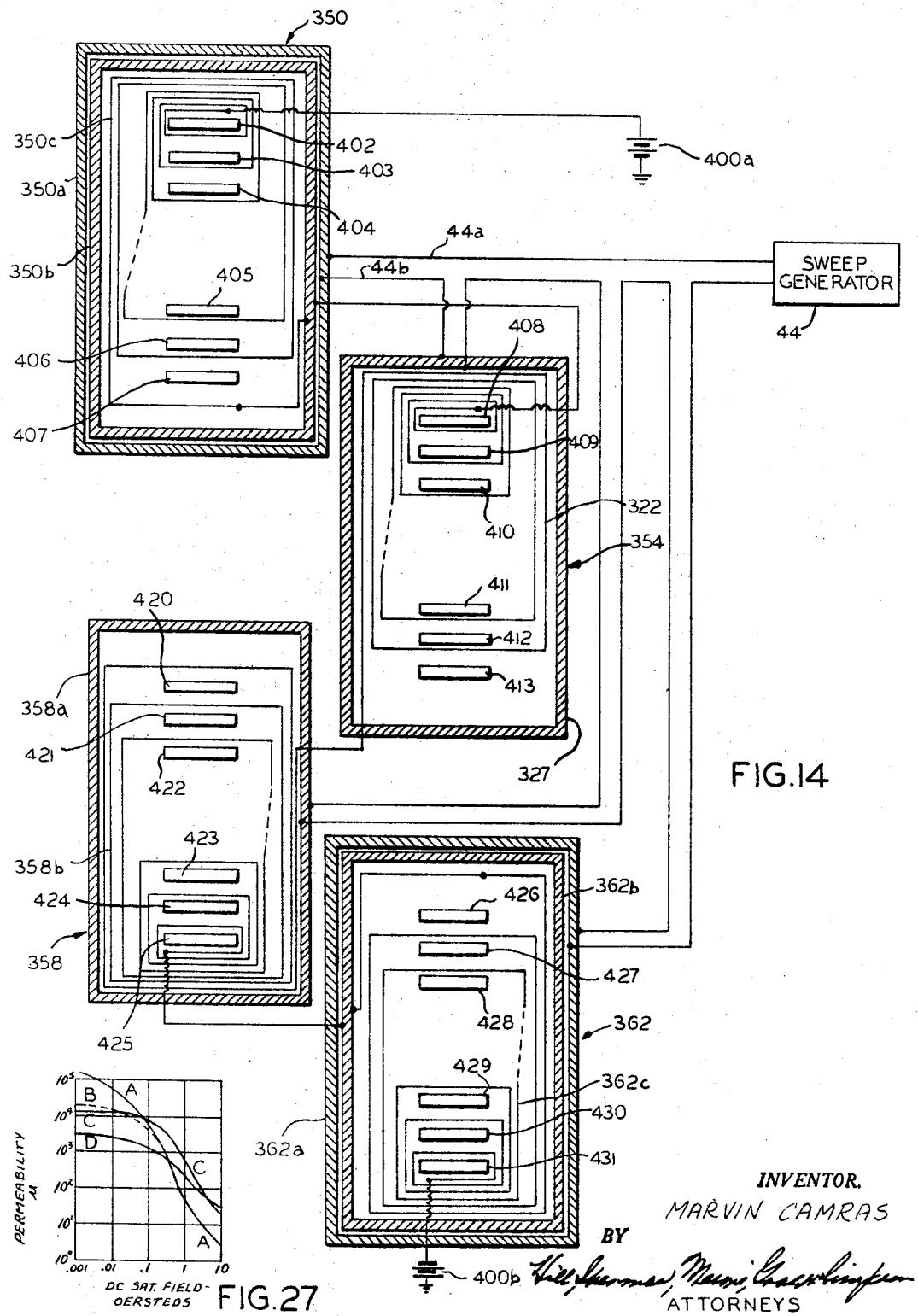
FIGURE 14 is a diagrammatic illustration of the winding arrangement for the head assembly of FIGURE 13 and illustrating the graded bias turns for one leg of each of the lamination units of FIGURE 13.

FIGURE 14 illustrates in a diagrammatic manner the electric circuit connections for certain of the windings of the assembly of FIGURE 13. Thus, the winding assembly 350 of FIGURE 13 comprises a sweep winding 350a, a common bias winding 350b, and a graded bias winding 350c which links the successive leg portions corresponding to leg portion 315 in FIGURE 12. The winding assembly 354 on the group 340 comprises the sweep winding 327 and a graded bias winding 322 having turns linking the legs of the successive head lamination units corresponding to leg 312 in FIGURE 12.

Winding assembly 358 for leg portions corresponding to leg 315 or group 342 has a similar configuration to winding 354 and includes a sweep winding 358a connected with sweep generator 44 in series with the other sweep windings and a graded bias winding 358b which is connected in series with the graded bias winding 322 and with the bias coil 350b and graded bias coil 350c with respect to bias source 400a and 400b. Winding 362 on the legs of group 343 corresponding to leg 312 in FIGURE 12 is similar to the winding means 350 but oppositely connected and comprises a sweep winding 362a connected in series with the other sweep windings and a common bias winding 362b and a graded bias winding 362c connected in series with the other bias windings.

While only one of the windings 350, 354, 358 and 362 of each lamination group is shown in FIGURE 14, each of the four windings of a given lamination group are of the same construction and are connected to the sweep generator 44 and bias supply 400a, 400b in the same manner as shown in FIGURE 14. By way of example, the successive windings of a given lamination group may be connected in parallel. Specifically, the sweep windings corresponding to sweep winding 350a of the winding assemblies 350, 351, 352 and 353 are connected in parallel. If, for example, graded bias winding 350c and common bias winding 350b produce fluxes in the legs corresponding to leg 315 in FIGURE 12 in the upward direction, then sweep generator 44 supplies current to sweep winding 350a in the initial part of its cycle so as to generate a flux in the leg which is directed downwardly to oppose the flux generated by the bias winding. At the initial part of the sweep corresponding to point 68 in FIGURE 6, the M.M.F. generated by the sweep current in winding 350a will exactly neutralize the M.M.F. produced in the top head lamination in FIGURE 14 designated by the reference numeral 402, by means of the bias windings 350b and 350c. By way of example, bias coil 350b may have 100 turns, and an additional 99 turns of the graded winding 350c may link the leg corresponding to leg 315 in FIGURE 12 of lamination unit 402. As in the preceding embodiments, at successive instants in the cycle of the sweep generator, the M.M.F.'s in lamination units 403 and 404 will be neutralized while the sum of the bias and sweep currents saturates the preceding lamination units and the succeeding lamination units. Lamination unit 403 may have a total of 198 turns of bias winding linking it while lamination unit 404 may have 197 bias turns linking the same. Lamination units 405, 406 and 407 may have 103, 102 and 101 bias turns linking them, respectively. Between lamination units 404 and 405, it will be understood that there may be 93 lamination units with successively fewer bias turns wound thereon so that the M.M.F.'s in these successive lamination units will be successively neutralized by the sweep current in the first part of the sweep cycle.

The lamination units 408, 409 and 410 may have 100, 99 and 98 bias turns respectively, while the lamination units 411, 412 and 413 may have two, one and zero bias turns linking the same, respectively, so that the M.M.F.'s in lamination unit 413 will be neutralized as the sweep current reaches its zero value as indicated at point 70 in FIGURE 6. Between lamination unit 410 and lamination unit 411 are lamination units with successively fewer bias turns, the first having 97 bias turns and the last having three bias turns. In this embodiment lamination group 341 has 99 lamination units, group 340 has 101 lamination units and groups 342 and 343 each have 100 lamination units.

Lamination units 420, 421 and 422 may have 1, 2 and 3 bias turns thereon, respectively, but in this case a positive sweep current above point 70 in FIGURE 6 will neutralize the bias M.M.F. due to the winding 358b. In the illustrated embodiment, the sweep winding 358a is wound in the same sense as the sweep winding 327 and connected to the sweep generator 44 in the same sense, but the graded winding 358b is wound in the opposite direction from the graded winding 322. Thus, as the sweep current rises above zero value indicated at 70 in FIGURE 6, lamination unit 420 will first be activated, then lamination unit 421 and then lamination unit 422 as the sweep current progressively increases in the positive direction. Lamination units 423, 424 and 425 may be linked by 98, 99 and 100 bias turns of winding 358b, respectively, while head lamination units 426, 427, 428, 429, 430 and 431 may be linked by a total of 101, 102, 103, 198, 199 and 200 bias turns respectively. By way of example, sweep windings 350a, 327, 358a and 362a may all have 100 turns, bias windings 350b and 362b may have 100 turns and the sweep generator may provide a current variation between minus two amperes and plus two amperes where the bias coils receive a current of one amp from the bias source 400a, 400b.

Figure 15:
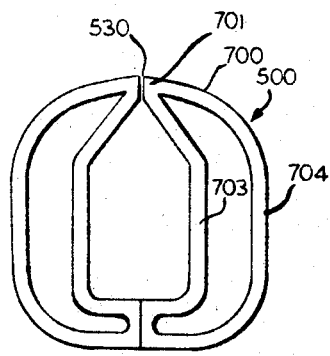
FIGURES 15 and 16 are side elevational views of modified head lamination units which may be stacked as illustrated in FIGURE 17 so that the windings of successive groups of laminations are offset for closer spacing of the adjacent groups of laminations.
Figure 16:
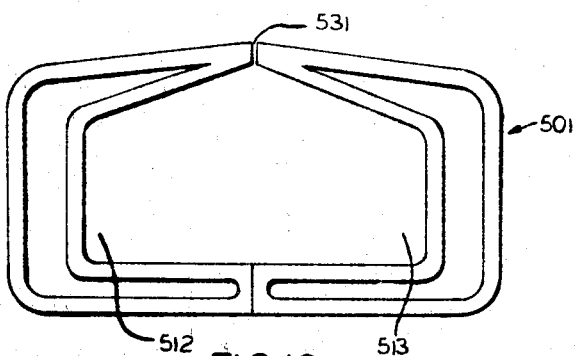
Figure 17:
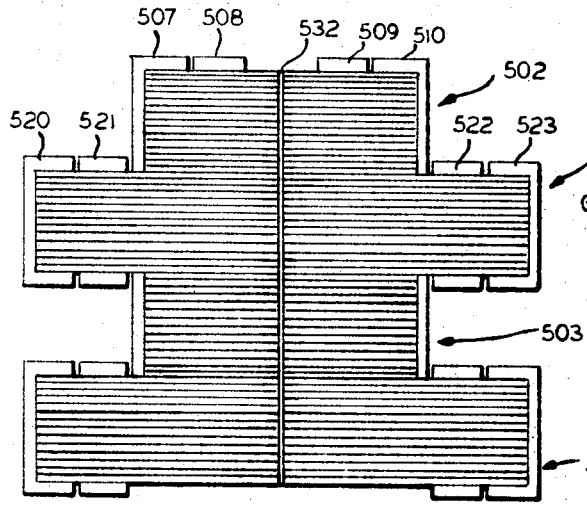
FIGURE 17 is a somewhat diagrammatic plan view of a head lamination assembly including successive groups of laminations of the type shown in FIGURES 15 and 16.

FIGURES 15, 16 and 17 illustrate a head assembly similar to FIGURES 12, 13 and 14, but utilizing symmetrical head lamination units 500 and 501 which provide lamination groups 502 and 503, and 504 and 505 respectively, as shown in FIGURE 17. Here the windings such as 507, 508, 509 and 510 fit within spaces such as 512 and 513 in the window of the large core lamination 501, while windings such as 520, 521, 522 and 523 fit on the outer side of the windings such as 507 and 510 of the small lamination groups 502 and 503. In this embodiment, also, the gaps such as 530 and 531 of the small and large head lamination units are all arranged in a straight line at right angles to the direction of tape travel and may receive a single gap spacer 532 as described in connection with FIGURE 11. It will be apparent that the winding connections and arrangement and other details for the embodiment of FIGURES 15, 16 and 17 may be entirely similar to the arrangement illustrated in FIGURES 12 and 14 for the preceding embodiment.

Figure 18:
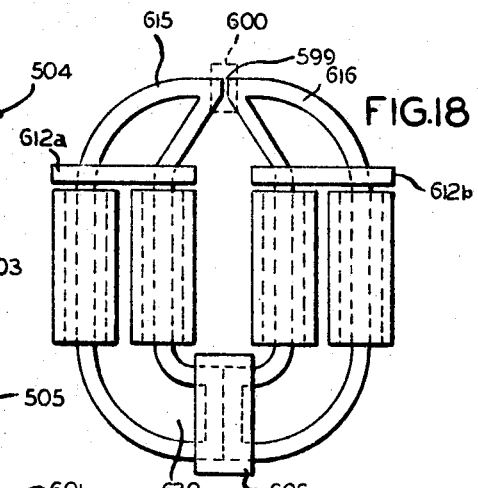
FIGURE 18 is a diagrammatic illustration of a transducer head utilizing the lamination configuration of FIG- URE 15 and showing the general winding positions for the head.

A single channel head is as illustrated in FIGURES 18 and 19. The coil 600 over the gap 599 may display the recording signal by means of an oscilloscope 601. The output pulse from the head corresponds to rate-of-change of gap flux. By means of a simple R-C integrating network indicated at 602, a pulse corresponding to the gap flux itself may be obtained on the oscilloscope screen. The gap coil is also useful in introducing a simulated playback signal to check playback action of the head. With a direct current output from signal source 603, and no output from bias source 604, and a sine wave output from sweep generator 608, a series of pulses will be seen on the oscilloscope, a pulse occurring each time the sinusoidal sweep generator current passes through a zero point to desaturate the signal flux path to gap 599. The polarity of the pulses may be reversed by reversing the polarity of the direct current output from the signal source to signal winding 606, and the pulse rate is double the output frequency of sweep generator 608. As direct current bias is added to bias windings 621, the pulses group themselves into pairs corresponding to points in each cycle of the sinusoidal sweep current when the bias flux cancels the sweep flux to desaturate the signal flux path. With increasing bias the pulses in each pair come closer, until they merge into a single pulse when the direct bias current is nearly equal to the peak of the sweep current. As bias is further increased the pulses disappear entirely, since the sweep current to sweep winding 620 no longer desaturates the signal flux path at any time in its cycle.

An important consideration is the rate at which these heads can be switched on and off. Single channel heads similar to that shown in FIGURE 19 were made of Supermalloy material of various thicknesses. Supermalloy comprises 5% molybdenum, 79% nickel, and the remainder iron and impurities. Pulse widths obtainable were:

| Lamination thickness (mils) | 2 | 1 | 0.5 | 0.125 |
|---|---|---|---|---|
| Pulse width (microseconds) | 1.2 | 0.5 | 0.25 | 0.15 |

The 0.5 mil material is thus adequate for video frequencies to 4 megacycles; and by special techniques can probably handle 8 megacycle picture components (or thicker material can be used for 4 mc.).

Static tests were made on heads similar to that in FIGURE 19 with a test circuit as in FIGURE 19. No sweep was used, the signal source was 1000 cycles, and direct current bias was varied while reading the output on a Ballantine voltmeter 610 across the oscilloscope. FIGURE 20 shows typical characteristics obtained. Without compensating turns, the output decreased with bias as in curve A. The output does not decrease indefinitely, but levels off because of stray pickup, and because the core still has appreciable permeability though "saturated."

When compensating coils are connected as shown at 612a and 612b near the gap, they form a bridge circuit which is balanced when the core permeability decreases to a certain value, and which is unbalanced in the opposite direction as the core permeability becomes even lower. This accounts for the behavior of curve B where compensating turns were used. Curve B falls more rapidly than curve A, reaches a minimum and then increases again. With more compensating turns, sensitivity further increases, and the curve becomes steeper, reaching its minimum with less bias current. But with more turns the curve reaches a higher value beyond the balance point. Curve B was taken with the compensating turns around a non-saturable portion of the core as would be the case if core parts 615 and 616 were solid at the pole portions rather than apertured above the sweep and bias winding 620 and 621 as shown.

When compensating turns are wound about a region which saturates with increasing bias, as shown in FIGURE 19, then their effect becomes progressively less, and the characteristic of curve C in FIGURE 20 is obtained, where a minimum is reached rapidly, followed by a maximum, which is still 42.5 db down, and then decreasing again indefinitely as current increases. The 60 db cancellation obtained is far more than required in any video system, and can be sacrificed to improve sensitivity.

With head lamination configurations with solid rather than apertured pole portions, for example as shown in FIGURES 1 and 9, cross coupling between adjacent close spaced cores may present a problem. An electrical analogy of the spaced magnetic circuits was analyzed, and showed that for spacing used in conventional multi-track heads, coupling was not serious; but for spacings of 2 mils or so as contemplated for the video heads, coupling was important. This coupling between adjacent head laminations can be overcome by saturating the head pole pieces all the way to the tips which form the gap. For this reason the thin section of the lamination follows all the way to the pole tips as shown in FIGURES 12, 15 and 19, which are preferred embodiments particularly for closely spaced gaps.

It was noted that the core could retain some residual magnetization. While this is swamped out by the high signals used in the recording process, it was noticeable under playback conditions. The bottom leg was found to be responsible for the residual magnetization. By cutting it out as indicated at 630 in FIGURE 19, sweep flux travelling in opposite directions through the horizontal parts of the bottom legs effectively demagnetized the sections, and no signal could be noted due to residual magnetization even under the most sensitive conditions. The head of FIGURE 19 was very sensitive to the earth's magnetic field, and a commercial embodiment thereof will probably have to be mounted in a high permeability shield. The head configuration, if opened up, would make an extremely sensitive magnetometer.

In choosing the best magnetic material for the cores it is desirable to know the magnetic properties and particularly the effective permeability at applied field intensities far into saturation. Such data was not available nor derivable from suppliers specifications, so a tester was set up for ring core samples, and different materials investigated under various conditions of anneal, lamination thickness, and mechanical stress. All these factors were found to be significant. Mechanical stress, for example, decreased the permeability of nickel-iron alloys under ordinary conditions but increased it when the material was saturated. Typical data is shown in FIGURE 27. Curve A is for 2 mil Supermalloy at 100 cycles. Curve B is for the same core at 15,750 cycles. Curve C is for 10 mil Mumetal at 1000 cycles. Curve D is for 2 mil Deltamax at 100 cycles. Mumetal has a composition of 5% copper, 2% chromium, 77% nickel and the remainder iron and impurities.

As an example of a video head, each head unit may comprise four laminations of 0.5 mil stock. Eighty head units with 1.5 mil copper barriers therebetween give an overall width of about 0.3 inch for 80 channels. Six of these assemblies can be stacked to give a continuous gap 1.8 inch wide and having 480 channels for video recording and reproduction.

For less stringent requirements a simpler construction is used. For example the head may consist of a single stack, or two stacks total, the stacks being ¼ to ½ inch high. Each head unit may be one mil or even 0.5 mil high for better lateral resolution. With an effective gap of 0.25 mil, the tape may be run at 7.5 or 3.75 inches per second. A ¼ inch tape records magnetic images corresponding to eight mm. motion picture film, while a ½ inch tape resembles 16 mm. film. These sizes are useful for amateur and industrial applications where recordings are to be viewed on a television receiver.

FIGURE 21 illustrates a modified head configuration wherein a magnetic core 650 has a pair of pole portions 651 and 652 defining a non-magnetic gap 653 for coupling to a portion of a magnetic record medium. It will be observed that the core includes a base leg portion 660 having a pair of portions 661 and 662 extending generally at right angles to the base leg portion and generally parallel to each other and substantially equally spaced from the gap 653. The parallel leg portions 661 and 662 have signal windings 665 and 666 thereon wound and connected to a signal source so as to be in series aiding relation with respect to the loop magnetic circuit provided by the core 650 and including the gap 653. The leg portion 660 may be normally saturated by means of a permanent magnet 670 in association with the U-shaped magnetic core 671 and a core part 672 extending within a sweep winding 675. The permanent magnet 670 is permanently magnetized in the axial or vertical direction as seen in FIGURE 21 to cause magnetic part 672 to assume one magnetic polarity, for example north magnetic polarity, while the free ends of core parts 671 assume the opposite magnetic polarity. With this arrangement, adjacent portions of the leg 660 normally receive saturating flux from the permanent magnet 670 to raise the reluctance of the series magnetic signal flux path and prevent recording of the signal supplied to the windings 665 and 666 on a record medium travelling adjacent the gap 653. When, however, a sweep current or pulse provides an opposing magnetomotive force sufficient to desaturate the leg portion 660, signal flux of operative amplitude will appear at the gap 653 and be recorded on the record medium.

A particular advantage of the illustrated core configuration is that at times when the leg portion 660 is saturated by the bias magnet 670, signal flux from the signal coils 665 and 666 which may exist along leakage paths in air tends to cancel the signal flux which extends within the magnetic material. As the magnetic core path is more completely saturated at leg portion 660, the neutralization of signal flux becomes more complete at the gap 653, so that as the value of bias flux from magnet 670 is increased signal flux at the gap may go through a null. It will also be noted that the axes of signal coils 665 and 666 are substantially offset from the median plane of the lamination extending vertically as seen in FIGURE 21 through the gap 653 and between the pole portions 651 and 652.

It will be understood that to construct a multiple gap head based on the core configuration of FIGURE 21, a series of the core laminations 650 would be stacked, for example as illustrated in FIGURE 17 and the common signal windings of all the core laminations would be connected together to all be energized at all times. The permanent magnets 670 associated with the successive head lamination units may have successively different magnetic strength to provide graded saturating bias fluxes in the same way as described in connection with FIGURES 4 and 5, for example. Thus, as an opposing sweep current is supplied to the sweep winding 675, for example of waveform as illustrated in FIGURE 6, the successive leg portions 660 of the successive lamination units would be desaturated to successively activate the respective gaps 653. The successive head lamination units may be suitably spaced and/or shielded, for example by means of copper spacers as described in connection with FIGURE 3.

FIGURES 22 and 23 illustrate certain details of preferred construction which may be applied, for example, to the embodiment of FIGURES 15–17 or to the embodiment of FIGURES 18 and 19 as applied to a multiple gap head construction. Assuming, for example, that FIGURES 22 and 23 refer to the embodiment of FIGURES 15, 16 and 17, the core parts such as indicated at 700 may conform in configuration to the core parts of the core 500 or 501 of FIGURE 15 or 16. The core part 700 has a polar portion 701 cooperating to define a gap such as indicated at 530 in FIGURE 15. The core part 700 has a pair of spaced generally parallel leg portions 703 and 704 of cross section and material to be readily saturated by means of suitable graded bias winding means such as indicated at 706 and 707 in FIGURE 23. A copper spacer member 710 of configuration somewhat similar to the core part 700 and additional spacer parts 712 and 713 may be provided between successive head lamination core parts such as indicated at 700 and 720 in FIGURE 22. The spacer member 710 may be of copper material and may have a generally rectangular window 721 defining a pair of spaced legs 723 and 724 adapted to coincide with the legs 703 and 704 of core part 700 and with legs 726 and 727 of core part 720. Slugs 730 and 731 of magnetic material may be inserted between the successive base leg portions 733 and 734 of the successive core parts 700 and 720 to provide a relatively continuous magnetic core over which the signal winding common to all the lamination units may be wound in the manner illustrated for winding 35 in FIGURES 4 and 5, for example.

It will be understood that when the successive parts 700, 710, 712, 713 and 720 are stacked, their side surfaces will be in contact and the top edges will form a substantially smooth record receiving surface. A gap spacer as indicated at 532 in FIGURE 17 may extend for the length of the assembly and edge faces such as indicated at 750, 751, 752 and 753 may abut flatwise against the gap spacer which may, for example, have a vertical extent comparable to the vertical extent of the spaced edge face 752.

The arrangement of the graded bias winding means 706 and 707 may be entirely similar to the winding arrangement and circuit details shown in FIGURE 14. The conductor forming the winding means 706 and 707 may be in the form of a flat sheet type metal ribbon of good electrically conductive material linking the legs of successive lamination units with successively increasing numbers of turns as diagrammatically indicated in FIGURE 23. The sweep windings may also be of flat ribbon conductive material and may encircle the entire group of core legs such as 703 and 726 which receive the graded bias winding means 707, for example. Alternatively, the sweep windings may be wound of wire in a more conventional manner, while using ribbon type bias windings. The embodiment of FIGURE 14, may, of course, utilize spacer members between successive laminations as illustrated in FIGURE 22 and may use ribbon type conductive sheets for forming the windings indicated diagrammatically in FIGURE 14. The ribbon may be of 0.0005 inch sheet copper, insulated on both sides with .00025 inch "Mylar" or "Teflon" sheet insulating material.

If the head configuration of FIGURES 18 and 19 is to be formed into a multigap assembly, for example such as indicated in FIGURE 17, the signal winding 606 would link all of the base portions of the core parts in common in the same manner as indicated in FIGURES 4 and 5, and the sweep windings 620 and bias windings 621 would be provided by ribbon type conductors as illustrated in FIG- URE 23, the winding pattern on the successive laminations corresponding to the arrangement of FIGURE 14, for example. Compensating turns could be wound adjacent the successive pole portion such as 701 in FIGURE 22 with each turn encircling all pole portions in common in the same manner as with the signal winding 606. The compensating turns may be wire wound directly above the sweep and bias windings as in FIGURE 19, for example, on the legs 703 and 704.

FIGURE 24 illustrates a further modification of the present invention wherein a pair of loop magnetic core parts 800 and 801 of substantially identical configuration are disposed to have pole portions 804 and 805 thereof in closely spaced confronting relation to define a non-magnetic gap for coupling to a record medium travelling across the gap generally as indicated in FIGURE 26. Each of the core parts receives suitable winding means such as indicated diagrammatically at 810 and 811 for carrying out the operations contemplated in any of the preceding embodiments. For example, the windings may actually comprise bifilar wound conductors as illustrated in FIGURE 9, or windings connected in a circuit such as illustrated in FIGURE 11, or successive laminations as illustrated in FIGURE 24 may be energized by a winding system such as indicated in FIGURE 14 or as described in connection with FIGURE 23. A feature of the embodiment of FIGURE 24 resides in supplying the signal winding to the successive laminations as illustrated in FIGURE 24 by means of an electrically conductive gap member 820 preferably extending in a straight line through the gaps of the successive lamination units as indicated in FIGURE 24. An electric signal current may be supplied to the gap member 820 through a transformer as indicated at 21 in FIGURE 24. Thus, the signal is supplied to each of the head lamination units as indicated in FIGURE 24 at all times, but the field is actually recorded only at the head lamination where the pole portions 804 and 805 are desaturated by a suitable opposition of the bias and desaturating or sweep signals to the winding means such as 810 and 811. Similarly in playback a signal flux is effectively picked up by conductor 820 only in the vicinity of a head unit which is desaturated.

FIGURE 25 illustrates a pair of loop core parts 840 and 841 having confronting pole portions 843 and 844 defining a non-magnetic gap 846 for coupling the lamination unit to a magnetic tape record medium 850 travelling successively across the pole portions 843 and 844. In this embodiment also winding means 810 and 811 may take any of the forms described in connection with FIGURE 24 to selectively or sequentially desaturate the pole portions 843 and 844 of a series of head lamination units. In this embodiment, the signal field is supplied to all of the lamination units in common by means of a single elongated U-shaped magnetic core 860 having a gap 861 disposed on the opposite side of the tape 850 from the gaps 846 and generally vertically aligned therewith as seen in FIGURE 25. A signal winding 863 links the core 860 to establish a signal field at the gap 861 over the entire length of the multigap head assembly. In this embodiment, the signal is concentrated sufficiently for recording only at the pole portions 843 and 844 of the lamination units which are desaturated at a given instant of time, the signal field being too diffuse to be effectively recorded at those lamination units where the pole portions 843 and 844 are saturated by the currents linking the windings 810 and 811.

In the embodiment of FIGURE 26, each lamination unit comprises a pair of loop magnetic cores 880 and 881 having saturable magnetic pole portions 884 and 885 defining a gap 886 for coupling the core to a magnetic tape record medium 850. The bias and sweep or desaturating winding means 810 and 811 may take any of the forms described in connection with FIGURE 24. In this embodiment, signal windings are indicated at 890 and 891 linking both legs such as 880a and 880b of each core part such as 880 in common. The signal windings 880 and 890 are wound and connected so that signal current tends to establish a signal field due to each winding which is in aiding relation to the other signal field at the pole portions 884 and 885. When the winding means 810 and 811 maintains the core parts 880 and 881 in a saturated condition adjacent the pole portions 884 and 885, the signal field is too diffuse to be effectively recorded on the record medium. When, however, a given core lamination is desaturated in any of the manners previously described, that lamination is activated to record a signal on the magnetic tape record medium 850 or to reproduce a signal previously recorded on the tape at the portion of the record medium coinciding with the activated gap such as 886.

In FIGURE 1, shields 46 and 47 are described as being of high permeability material. The shield members may be of a high permeability alloy such as "Mumetal" to shield against unbalanced fields from the permanent magnets such as 37 and 38. Alternatively, however, the shields 46 and 47 may be replaced by a shield assembly of copper and "Mumetal" sandwich construction. The sandwich type shield may comprise outer layers of "Mumetal" each formed of two laminations of configuration conforming to that of members 46 and 47 in FIGURE 2 separated by an insulating layer 48. The center layer of copper shielding may comprise a pair of laminations of configuration similar to members 46 and 47 and the copper laminations may be separated by insulating layers such as indicated at 48 with respect to each other and with respect to the outer "Mumetal" laminations. As a further alternative, where direct current magnetic fields are not important and high frequency fields are to be shielded, the laminations such as indicated at 46 and 47 may be of copper material and no high permeability magnetic material need be used. Such an all copper shield 45 would be possible in the absence of permanent magnet biasing means. Any of the embodiments shown diagrammatically without shielding may be provided with shielding means such as shown and described in connection with FIGURES 1 and 2 under circumstances which will be apparent to those skilled in the art from the present description.

The magnet system of FIGURES 4 and 5 may be provided with angularly adjustable compensating shunts such as indicated at 82 in FIGURES 7 and 8 in alignment with the respective head laminations. Such angularly adjustable shunt elements could be used for individual adjustment and balancing of each of the magnetic circuits to compensate for any slight dimensional irregularities and other conditions interfering with the activation of the successive head units in a uniform manner as described in connection with FIGURE 6.

With respect to the embodiment of FIGURE 11, it will be understood that the biasing magnetic fields in the successive lamination units should vary in a regular manner throughout. Thus, the increment in resistance between successive resistors $R_1$ through $R_{500}$ should produce equal current differences. If the difference in current through resistors $R_1$ and $R_2$ is one unit, the algebraic difference in current between resistors $R_{251}$ and $R_{250}$ should also be one unit, for example from minus one-half unit in resistor $R_{250}$ to plus one-half unit in resistor $R_{251}$. With this assumption, the current in resistor $R_1$ would be plus 249½ units and the current in resistor $R_{500}$ would be minus 249½ units.

In FIGURE 14, the current is preferably equal in all of the turns so that there must be a uniform difference in the number of turns linking the successive head lamination units. While theoretically it would be possible to have one-half turn linking lamination 413 to generate a bias flux of plus one-half unit and to have a half turn linking lamination 420 in the opposite direction for one half turn to provide minus one-half units of bias flux, it is more convenient to have zero turns linking lamination 413 and one turn linking lamination 420 to provide, for example, plus two units of bias flux in lamination 411, plus one unit of bias flux in lamination 412, zero units of bias flux in lamination 413 and minus one unit of bias flux in lamination unit 420. Under these circumstances, for a total of 400 lamination units, lamination 402 would receive plus 199 units of bias flux and lamination 431 would receive minus 200 units of bias flux, for example.

With respect to embodiments such as illustrated in FIGURES 12 and 13 and FIGURES 15, 16 and 17, where certain of the magnetic paths for bias and sweep magnetic flux are longer than other of the paths, for best balance it may be desirable to use more ampere turns linking the longer flux paths. For example, in FIGURE 15 it may be desirable to use more ampere turns on leg 704 than on leg 703, and to use even more ampere turns on the legs of the larger lamination of FIGURE 16 with the number of ampere turns increased in each case in proportion to the length of the leg on which the bias winding and sweep winding is wound. In the case where progressively more ampere turns are used in proportion to the length of the legs with which the ampere turns are associated, the bias and sweep ampere turns are arranged to neutralize each other simultaneously in the associated legs forming a given lamination, so that at the instant a given head lamination is activated, the bias and sweep ampere turns are neutralized in legs 703 and 704, for example, simultaneously.

While in FIGURE 14, for convenience of illustration, it has been suggested that the windings associated with the legs of a given head unit may be connected in parallel, it is preferable to connect all of the bias windings of each head unit and of all of the head units in succession in series rather than in parallel to insure equal currents in all of the windings. Thus, in a preferred example, referring to FIGURE 14, lead 44a from sweep generator 44 would connect to one terminal of winding 350a as shown, but lead 44b would extend from the other terminal of winding 350a to a first terminal of a similar sweep winding (not shown) which may be designated as part 351a of winding 351 in FIGURE 13, which would link all the legs similar to leg 314 in FIGURE 12. The other terminal of winding 351a (not shown) would be connected to one terminal of a similar sweep winding which may be designated 352a (not shown) linking all of the legs of group 341 similar to leg 313. The other terminal of this winding 352a would then be connected to a first terminal of a similar sweep winding which may be designated 353a (not shown) which would link legs such as 312 of the laminations of group 341 in FIGURE 13. Finally, the remaining terminal of the sweep winding 353a would be connected to the first terminal of sweep winding 327 as indicated in FIGURE 14, the other terminal of 327 being connected to a first terminal of sweep winding 328, the other terminal of sweep winding 328 being connected to a first terminal of sweep winding 329, and the other terminal of sweep winding 329 being connected to a first terminal of sweep winding 330 and the other terminal of sweep winding 330 being connected to a first terminal of sweep winding 358a. In this same manner, all of the sweep windings of the successive groups 341, 340, 342 and 343 in FIGURE 13 may be connected in series, and the bias windings of the successive groups may be connected all in series in an entirely similar manner with respect to the bias supply 400a, 400b. This same series connection of bias windings and of sweep windings is preferred in each of the other embodiments disclosed herein.

FIGURE 12 illustrates by means of arrows in legs 312, 313, 314 and 315 the direction of bias flux due to the bias windings 322–325. The bias windings are preferably connected in series to give flux in the directions indicated. With this orientation of bias flux, each section of the head assembly such as the section including legs 312 and 313 and base 307 has a bias circulating flux, and the direction of circulation in each section of the head unit is in the opposite direction from the other section. That is, the bias flux in legs 312 and 315 are opposed at the gap 306, and the bias fluxes in legs 313 and 314 are opposed at the gap.

It will be understood that if the bias fluxes are oriented as indicated in FIGURE 12 for group 340 of FIGURE 13 the bias fluxes will be oriented in the opposite sense in the head units of group 342. This can result from a different direction of winding of the graded bias winding 358b as compared to the direction of winding of graded bias winding 322 in FIGURE 14, or can result where the bias windings of groups 340 and 342 are wound in the same direction, but are connected so that current flows in opposite directions through the windings. The same situation is, of course, present with respect to the bias windings for groups 341 and 343, since the bias fluxes in the laminations of group 341, for example, may be successively neutralized in the negative portion of the sweep current cycle while the lamination units of the group 343 are to be successively neutralized in the positive portion of the sweep current cycle illustrated in FIGURE 6.

With respect to the embodiment of FIGURES 22 and 23, the spacer part 710 may have the same exterior shape as the base leg portions such as 733 and 734 so that the surfaces 750–753 and the corresponding surfaces of the base leg portions, 733a and 734a, and the corresponding surfaces of the parts 710 and 713 may all be polished to lie in the same plane and eventually mated with similar coplanar surfaces of the other section of the head.

It should be emphasized that the embodiments illustrated herein are merely by way of example, and that within the broad concepts of the present invention many modifications may be made. For example, electronic gates may be used to block the signal between signal source 36 and winding 35 in FIGURE 1 during recording until the desired head unit is activated by the sweep generator 44, so that any point on an area of tape may be recorded independently of any other point. Similarly, on playback, the output from the winding 35, for example, in FIGURE 1 may be blocked before reaching the playback amplifier input by a suitable electronic gate until the desired head unit is activated by the sweep generator 44, so that any point on the area of the tape may be played independently of any other point. This is true of each embodiment illustrated herein.

With respect to FIGURE 15, for example, the pole pieces such as indicated at 701 may be made separate from the remainder of the core so as to be replaceable in case of wear. Alternatively, the gap 530 may be slightly larger than desired, and separate pole tips having a relatively fine gap may be superimposed on the core sections such as 700 immediately above the gap 530 for receiving the record medium thereacross. This same type of modification is, of course, applicable to each of the embodiments illustrated.

For less stringent requirements each head unit may be made narrower, and the overall head assembly can be reduced in width to one-half or one-quarter inch overall, for example. Such a very narrow multiple head is useful, for example, for amateur motion picture cameras wherein a moving light image is scanned electronically to produce a video signal which is then recorded on magnetic tape by means of a head in accordance with the present invention, all in the same portable apparatus. Record speeds down to 3¾ inches per second are practical, for example, for video recording if a fine gap is used in the head units, for example .00010 to .00025 inch.

It will be undestood with respect to the various embodiments, that the various windings may be located only on a half section of the head such as the half section 308, 314, 315, 319 in FIGURE 12, and that the opposite half section shown in FIGURE 12 may be replaced by a single magnetic core member extending for the width of the head and defining a gap with the pole tip such as 319 of each of the successive head lamination units. In other words, referring to FIGURE 13, all of the portions of the head assembly to the left of the gap spacer 345 may be omitted, and a single magnetic core element without any windings substituted therefor. The core element may have the general configuration of the lamination unit 307, 312, 313, 318 shown in FIGURE 12, but need not have a window between the legs 312 and 313. However, it is preferable to maintain a balanced condition by using symmetrical head configurations such as shown in FIGURES 1, 2, 8, 9, 15, 18, 19, 24, 25 and 26 where the applied bias and sweep magnetomotive forces do not produce a field at the head gap.

An important feature of the present invention resides in the fact that head units adjacent the active one have their pole tips at at least one side of the gap saturated so as to reduce the shunting effect of the adjacent head laminations on the active lamination.

As further possible modifications of the invention which do not by any means achieve many of the important objectives accomplished by the embodiments specifically illustrated, it may be noted that the various head configurations illustrated may be provided with shunt magnetic paths interposed between the signal winding and the gap and serving to provide a shunt path in parallel with the path through the pole tips and across the gap. Such a shunt path when saturated would by-pass relatively little signal flux from the signal winding, but when unsaturated would provide a relatively low reluctance shunt path which when properly proportioned could effectively prevent recording of a signal supplied to the signal coil on the record medium crossing the gap. In this instance, the shunt path would be saturated to activate the head unit and would be desaturated to deactivate the head unit, the reverse of the other embodiments illustrated in this case.

FIGURE 1 has been utilized to illustrate a suitable electric circuit which may also be applied to any of the other embodiments disclosed herein. In this specific example, it is assumed that the signal source 36 may comprise a conventional television receiver set for providing a video signal together with suitable horizontal and vertical sync pulses and the accompanying audio signal. Alternatively, the source 36 may comprise a television camera, for example, using an image orthicon as the pickup tube. The picture signal from the signal source 36 is delivered to a record video amplifier 930 which serves to place the signal in proper condition for supply to the signal winding 35. A voltage source 931 shunted by a capacitor 932 having low impedance at video frequencies may be provided for direct current restoration or bias of the picture signal. A similar direct current source may be inserted in series with the sweep coils 40–43 under some conditions. A more complex circuit for direct current restoration of video signals is illustrated in Zworykin and Morton "Television" Second Edition (1954), Figures 16.23(a), page 739. The signal source 36 may include a sync separator for separating the synchronizing portion of the video signal from the picture signal portion and may further include vertical and horizontal sync separators for separating the vertical and horizontal synchronizing signal components at the output of the sync separator. The horizontal sync signal from the horizontal sync separator may be delivered to the sweep generator 44 as indicated at 66 in FIGURE 1 to synchronize the horizontal saw-tooth waveform shown in FIGURE 6 with the video line rate. The horizontal and vertical sync separators of signal source 36 may also be utilized to generate blocking pulses during the return or flyback portions of the horizontal sweep signal and at the ends of the vertical sweep which may be delivered to a gate 934 via line 935 indicated in FIGURE 1. The gate 934 may thus be operative to block delivery of the video signal to the signal winding 35 during the horizontal retrace periods and at the ends of the vertical sweep in each frame of the video signal.

During reproduction of a video signal recorded on the tape 10, switch arms 940 and 941 would be placed in their right hand positions to connect the signal winding 35 to the input of a playback video circuit component 945. The component 945 may include a video amplifier whose output may be fed to a conventional picture tube such as indicated at 947 having horizontal deflection coils such as 948 and vertical deflection coils such as 950. A suitable kinescope deflection generator circuit component indicated at 953 may be provided for furnishing suitable horizontal and vertical deflection signals to the deflection coils 948 and 950. Switch arms 960 and 961 may in their right hand positions during playback to deliver a suitable saw-tooth wave output as shown in FIGURE 6 from component 953 to the sweep windings 40–43. The saw-tooth sweep signal is synchronized with the horizontal deflection signal to the deflection coils 948 by component 953.

Preferably the component 953 is synchronized with the motion of tape 10 so that the sweep signal to sweep windings 40–43 will cause the head assembly to precisely scan the recorded signal on the tape. For example, the horizontal and vertical synchronizing signal components from signal source component 36 in FIGURE 1 may be recorded on a control track 955, FIGURE 1A, of the tape 10 by means of a control head having a longitudinal gap in direct transverse alignment with the gaps 18 shown in FIGURE 2. The connection of the signal source sync separator with the control head during recording is indicated by line 962 in FIGURE 1. On playback, the same control head may reproduce the sync signals recorded on the tape and the output of the control head may be delivered to the component 953 as indicated by line 970 in FIGURE 1 to synchronize the deflection generators of component 953 with the speed of the tape 10. In this manner, each head unit may be activated while in direct alignment with a magnetized element of the tape produced during the recording operation.

Gate 971 shown in FIGURE 1 may be controlled by compouent 953 as indicated by line 973 so as to block the output of the playback video amplifier of component 945 during periods of the recorded video signal corresponding to the horizontal retrace time and the ends of the vertical sweep.

During playback, it is desirable to compensate for drift, etc. in tape speed, and this may be done by comparing the sync signals from playback with some master synchronizer. The difference, if any, is used to speed up or slow down the drive mechanism of the video tape reproducer (as for example by tightening or loosening a brake on the drive capstan) in such a manner as to maintain synchronism between tape signals and the master synchronizer.

If the successive lines 980 of the video signal recorded on a vide track 979 of tape 10 are substantially separate as indicated in FIGURE 1A rather than overlapping, the first head unit of the multiple gap head assembly of FIGURE 1, for example, will generate a pulse at the beginning of each line of the recorded signal. This pulse from the first head unit contains not only picture information but horizontal sweep synchronizing information which may be separated by component 945 in FIGURE 1 and transmitted to deflection generator component 953, instead of the control signal from a separate control head. Switch 982 in FIGURE 1 is placed in its right hand position when the synchronizing information is to be obtained from the video track 979 of the tape rather than from the separate control track 955 which may then be eliminated. As indicated at 983 in FIGURE 1A, the recorded picture signal tends to have a series of recorded lines of greater intensity at the end of each sub-frame which can also be sensed by the head units associated with track 979 and separated as a vertical sync pulse by component 945 and fed to component 953.

In FIGURE 1A, reference numeral 984 indicates a horizontal sync pulse on control track 955 and 985 indicates a vertical sync pulse. The successive recorded pulses 984 may correspond to the beginning of every second or third line of the recorded video signal where the successive lines are very closely spaced or overlapping on the tape. Reference numeral 987 represents the audio track on the tape which is preferably recorded and reproduced by a longitudinal gap head having its gap in exact transverse alignment with the gaps 18 shown in FIGURE 2 and with the gap of the control head. During recording, the audio head may be energized with the sound portion of the video signal from source 36 as indicated at 990, while on playback, the output of the audio head may be delivered via line 992 and audio amplifier 993 to loudspeaker 995. The audio track is thus precisely synchronized with the picture and control signals on the tape 10.

Gates such as indicated at 934 and 971 are useful in data recording also where data is to be recorded selectively at different locations on a multichannel record tape, since in the recording process, the gates may be opened only at the portion of the sweep cycle corresponding to activation of a selected head unit. Thus the signal is available in the head assembly only at the instant of time when it is to be recorded on the tape. Similarly on playback, a gate such as indicated at 971 could block the output signal circuit except at the instant when a selected head unit was activated.

It will be noted that a signal is generated during reading or playback of the tape with the heads of the present invention whether the tape is moving or not, depending only on the presence of a magnetized element on the tape at the activated head unit.

In general, it will be evident that many of the features described in connection with the various specific embodiments will be readily applicable to other of the embodiments, and all such modifications should be considered as specifically disclosed herein. For example, the video recording and playback circuits illustrated in FIGURE 1 are directly applicable to the other embodiments. The components in FIGURE 1 may be interposed between the signal source 36 and the winding 310 in FIGURE 12, for example, including record video amplifier 930, D.C. restoring circuit 931–932 and gate 934. Similarly, the output system illustrated in FIGURE 12 may comprise playback video component 945, gate 971, picture tube 947 and deflection generator component 953. The embodiment of FIGURE 12 may be provided with any of the core lamination configurations indicated in FIGURES 15, 16, 19, and 22 through 26. Further, compensating windings such as illustrated in FIGURE 19 should be considered as also disclosed in connection with FIGURE 12. The methods of introducing a signal magnetomotive force to the core illustrated in FIGURES 24, 25 and 26 should also be considered as specifically disclosed with respect to FIGURE 12, for example.

With reference to the embodiments of FIGURES 1 and 9, for example, it will be understood that a combination of the two figures is possible where the sweep flux is introduced by means of windings such as 119 and 121 in FIGURE 9 on a closed magnetic path, such as provided by magnetic parts 107 and 112 in FIGURE 9, without any non-magnetic gap therein, while the bias flux is introduced across non-magnetic gaps as shown in FIGURE 1, for example by means of a bias magnet 37. In this case, the sweep current might always be of one polarity, for example, so that one leg of the closed magnetic path, such as that part of core 112 linked by winding 19 in FIGURE 9, would always be saturated, while the leg 107 would be desaturated when the sweep current in winding 121 produced a sweep magnetomotive force cancelling the bias magnetomotive force in leg 107 due to a bias magnet such as indicated in 37 in FIGURE 1.

With reference to the embodiment of FIGURES 12–14, groups 340–343 may each have 100 laminations as initially made, with a graded bias winding thereon linking the first lamination with one turn and the last lamination with 100 turns. Group 341 assemblies would then be formed with 101 bias turns linking unit 407 in FIGURE 14 and 200 bias turns linking unit 402. For group 340, an additional lamination unit would be added to the initial stack of 100 units to provide the unit with zero bias turns corresponding to unit 413 in FIGURE 14. Lamination unit 408 would then have 100 turns and group 340 would have a total of 101 lamination units.

Instead of separate coils such as 350a and 350b in FIGURE 14, it is advantageous to use a single coil which carries both the sweep current and the bias current. This reduces $I^2R$ heating losses because the sweep and bias currents are opposed part of the time. If two coils are used they should preferably be bifilar wound. These two arrangements give more nearly perfect cancellation of the bias and sweep magnetomotive forces and minimize leakage flux.

The ribbon windings such as 706 and 707 in FIGURE 23 may be split lengthwise into two or more separate insulated ribbons linking the same group of core leg portions, and the separate ribbons on the same group of leg portions may be connected in series if a higher impedance is desired. By using several sections of ribbon on a given group of leg portions, eddy currents are reduced.

The conductive ribbon or ribbons linking the respective groups of leg portions may be formed by electrodeposition on a masked portion or on masked portions of an insulating strip such as Mylar tape.

The recording heads shown or described herein may be operated with no bias, or with direct current or high frequency bias superimposed on the signal field at the gap, depending upon the particular conditions and upon the application. The direct or alternating current bias may be introduced separately from the signal winding if desired.

In using the head constructions shown or described herein as playback heads, Hall effect elements or other means responsive directly to signal flux rather than to rate of change of signal flux may be substituted for the common signal windings shown.

While numerous modifications of the invention have been illustrated or described herein, there is no intention to suggest equivalency of the several embodiments, nor is there any intention to limit the scope of this invention to the specific embodiments described by way of example. It is obvious that many other modifications and variations may be made in light of the teachings and principles disclosed herein without departing from the scope of the novel concepts of the present invention.

In FIG. 28 as illustrated a magnetic transducer head 1010 having a magnetizable medium 1011 moved across a top edge thereof by means of a take-up spool 1012. Flux is concentrated at a high reluctance gap 1013 for interaction with the tape 1011. For impressing an audio signal from a signal source 1009 on the core of the head 1010, a voice coil 1015 links the two core loop portions 1016 and 1017 to set up fluxes in parallel through the loops 1016 and 1017 and across the gap 1013. It will be observed that the core loop 1016 lies in the general plane of the core loop 1017 but is of dimensions to extend in spaced relation to the core portion 1017, so that the core portion 1017 is in effect nested within the portion 1016.

For preventing magnetization of the core during recording, an A.C. flux preferably of high frequency is established in the core material, which flux is preferably of sufficient magnitude to keep the core completely demagnetized. In the illustrated embodiment, core portions 1019 and 1020 are provided connecting the loops 1016 and 1017 on each side of the gap 1013 to provide a flux path independent of the gap 1013. The demagnetizing or circulating flux is preferably provided by coils 1021, 1022, 1023 and 1024 which are preferably wound in series aiding relation with respect to the flux path shown by arrows 1025–1028 in FIG. 28. As indicated by the arrows 1025–1028, the coils 1021 and 1024 tend to establish a flux traveling from left to right in the gap 1013, while the coils 1022 and 1023 tend to set up a flux traveling from right to left in the gap 1013. By proper adjustment of the ampere turns in each of these coils, it will thus be seen that the M.M.F. across gap 1013 can be neutralized to produced no flux across gap 1013 due to coils 1021–1024. When so adjusted the circulating flux produces no field at gap 1013 which might affect the tape.

If the demagnetizing flux is balanced at gap 1013 by symmetry or by compensating adjustment of the ampere turns, then the required high frequency bias for recording may be supplied from a bias oscillator 1029 connected with coil 1015. Alternatively, a degree of unbalance can purposely be incorporated in the arrangement of the coils 1021–1024, and this unbalance can be adjusted to provide the proper high frequency bias during recording. In any case the bias flux is preferably of the same frequency as the demagnetizing flux, or an integral multiple thereof.

The head 1010 may also be operated as a playback head. In this case the circulating flux is adjusted to a level well below the saturation value for the core. Such operation has been found to increase the permeability and sensitivity of the core; and distortion and noise due to residual D.C. core flux are substantially reduced. In some cases, it is advantageous to operate with a circulating flux of a value at or below the toe of the initial magnetization curve.

In FIG. 32 is shown a representative plot of permeability as a function of the amplitude of flux density in the core. It will be observed that the core permeability may be increased considerably above its "initial permeability" value by the use of circulating flux well below the region where saturation occurs, so that operation in the region indicated by $\mu$max. is advantageous from the standpoint of sensitivity.

During playback, the switch 1031 indicated in FIG. 28 may be moved to its dash outline position to connect coil 1015 to a low pass filter such as indicated at 1030 to block any high frequency output due to the circulating flux in the core. At the same time the circulating flux may be changed to an optimum playback value. The output obtained from the filter 1030 thus varies in accordance with the rate of change of signal flux in the core portions 1016 and 1017 and may be termed the direct low frequency signal voltage. It will be understood that an amplifier which was relatively non-responsive to the high frequency circulating flux could serve as the filter means in place of the filter 1030.

A second magnetic transducer head according to the present invention is illustrated in FIGS. 29, 30 and 31, wherein the core loops 1032 and 1033 are laterally spaced and have respective pole portions 1035, 1036 and 1037, 1038 defining a non-magnetic gap 1040 for receiving a magnetizable record member 1041 driven by a take up reel 1042. In this embodiment the pole pieces 1035 and 1037, and 1036 and 1038 are preferably secured in abutting relation as by spot welding to define a third flux path. The high frequency demagnetizing flux may be induced in the third flux path by means of series aiding windings 1044 and 1045, FIG. 31, while the voice signal may be impressed by means of the winding 1046 encircling portions 1032 and 1033 in parallel. The cores 1032 and 1033 are preferably supported by means of a Bakelite housing extending on each side of each of the core portions 1032 and 1033 to prevent vibration. This second embodiment has the advantage of core paths which are more symmetrically arranged with respect to the gap 1040 and thus better balanced, and the same electrical connections may be made as illustrated for the head of FIG. 28. Similarly, the head of FIG. 29 may be operated as playback head in the manner described above.

The heads of FIGS. 28 and 29 can be provided with a pair of separate circulating flux paths as by connecting the core loops 1016 and 1017 in FIG. 28 by core portions extending between point 1050 of loop 1016 and point 1051 on loop 1017. A second gap configuration similar to that at 1013, 1019, 1020 would thus be provided between 1050 and 1051. The windings 1021 and 1022 would thus establish circulating flux in a loop bounded by core portion 1019 and a core portion bridging between 1050 and 1051; and the windings 1023 and 1024 would establish flux in a loop including core portion 1020 and a second core portion between 1050 and 1051, the winding 1015 being positioned as shown.

It will be apparent that the cores of FIGS. 12, 15, 16, 18, 19, 22, 24, 25 and 26 may be operated as conventional record or playback heads and have circulating demagnetizing fluxes therein as described in connection with FIGS. 28–32.

While I have shown particular embodiments of my invention, it will, of course, be understood that I do not wish to be limited thereto since many modifications may be made without departing from the spirit and scope of my invention. I, of course, contemplate by the appended claims to cover all such modifications as fall within the true spirit and scope of my invention.

I claim as my invention:

1. A magnetic head comprising a magnetic core having a signal flux path including a magnetic pole portion with a nonmagnetic gap adjacent thereto for receiving a magnetic record medium and said signal flux path including two spaced legs in parallel with respect to said signal flux path, said two legs providing a loop magnetic circuit including said two legs in series but excluding said gap, bias winding means encircling each of said legs of said loop magnetic circuit and connected to establish a series saturating bias flux in the circuit and through said two legs in series to saturate the two legs, control winding means encircling each of the two legs of said loop magnetic circuit for providing a control flux opposing the bias flux produced by the bias winding means in said two legs, signal coupling means coupled with said signal flux path including said two legs in parallel and said pole portion for providing interlinkage between an electric signal in said signal coupling means and a magnetic signal flux in said gap adjacent said pole portion, and means for connecting a control signal with said control winding means of magnitude to effectively place said two legs in unsaturated condition.

2. The magnetic head of claim 1 with shielding means between said control and bias winding means and said gap for blocking leakage flux paths extending from said control and bias winding means to said gap.

3. The magnetic head of claim 1 with said signal coupling means comprising a signal winding at least in part encircling said two legs in common.

4. The magnetic head of claim 1 with said signal coupling means linking said magnetic core at a position more remote from said gap than said control and bias winding means.

5. The magnetic head of claim 1 with said two legs each having at least a part thereof which is saturated by an applied field of the order of 0.5 oersteds.

6. The magnetic head of claim 1 with said signal coupling means comprising a recording winding coupled with said pole portion but disposed on the opposite side of the path of the record medium from said pole portion.

7. A magnetic recording head comprising
 (a) a magnetic head unit comprising a magnetic core having a pair of spaced magnetic pole portions defining therebetween a nonmagnetic gap,
 (b) a magnetic tape record medium having a longitudinal dimension extending across said magnetic head unit with the gap of the head unit adjacent and in coupling relation to the record medium, (c) means for moving said magnetic tape record medium in the direction of said longitudinal dimension thereof to move the record medium across the pole portions while maintaining the record medium in coupling relation to the gap of the head unit, (d) said magnetic core having a loop recording flux path extending through said pole portions thereof and through the magnetizable material of the record medium, (e) at least one pole portion having a continuous ferromagnetic circuit having two legs in parallel with respect to said loop recording flux path, (f) a recording winding coupled to said loop recording flux path of said core, (g) a recording current source for supplying electric current to said recording winding for producing magnetic recording flux in the loop recording flux path, (h) control windings encircling each leg of said core for producing control magnetomotive forces in the respective legs which are in aiding relation with respect to said continuous ferromagnetic circuit but which are substantially equal and opposite with respect to said recording flux path, and (i) a control source for supplying control current to said control windings on the respective legs to produce a control flux in said continuous ferromagnetic circuit for controlling the magnetic condition of said circuit.

8. The recording head of claim 7 with (j) said recording winding at least in part encircling said two legs in the same direction with respect to said loop recording flux path.

9. The magnetic recording head of claim 7 with (j) said control source establishing a circulating demagnetizing flux in said continuous ferromagnetic circuit during recording.

10. The magnetic recording head of claim 7 with (k) means for establishing a high frequency demagnetizing flux in said continuous ferromagnetic circuit and for simultaneously establishing a high frequency bias flux at said gap.

11. A magnetic head comprising (a) a magnetic core having a pair of magnetic pole portions defining a non-magnetic gap for coupling to a magnetic record medium, (b) said magnetic core having a loop magnetic flux path extending through said pole portions and through the non-magnetic gap in series for providing magnetic flux interlinkage between the record medium and the magnetic core, (c) at least one pole portion of said magnetic core having a continuous ferromagnetic circuit including two legs in parallel with respect to said loop magnetic flux path, (d) a transducing winding coupled to said loop magnetic flux path and providing for transducing between a magnetic flux variation in said loop magnetic flux path and an electric current variation in said transducing winding, (e) first and second control windings encircling each leg of said core, and (f) first and second scanning control sources for supplying first and second control currents to said first and second control windings respectively to produce first control magnetomotive force waveforms in the respective legs and second control magnetomotive force waveforms in the respective legs which are respectively in aiding relation with respect to said continuous ferromagnetic circuit but substantially cancel at said gap and with said first and second control magnetomotive force waveforms combining to provide a net cyclically varying control magnetomotive force waveform in the continuous ferromagnetic circuit which net control magnetomotive force waveform is of an amplitude corresponding to a magnetically saturated condition of said legs during a major portion of each cycle of operation but passes through a zero amplitude value in each successive cycle of operation to place said core in transducing condition.

12. The magnetic head of claim 11 with (g) shielding means for blocking leakage flux paths extending from said control windings to said gap.

13. The magnetic head of claim 11 with (g) shielding means between said transducing winding and said gap for blocking leakage flux paths therebetween.

14. The magnetic head of claim 11 with (g) compensating winding means coupled to said two legs in the same direction with respect to said loop magnetic flux path and connected in opposing relation to said transducing winding with respect to said loop magnetic flux path.

15. The magnetic head of claim 11 with (g) said transducing winding at least in part encircling said two legs in the same direction with respect to said loop magnetic flux path.

16. The magnetic head of claim 11 with (g) said transducing winding encircling said magnetic core at a position more remote from said gap than said control windings.

17. The magnetic head of claim 11 with (g) said legs having at least a part thereof which is saturated by an applied field of the order of 0.5 oersted.

18. In combination, a series of magnetic cores arranged in laterally offset aligned relation and having respective signal flux paths including respective pole portions and respective gaps adjacent thereto for coupling with successive transversely offset portions of a record medium and said signal flux paths including respective pairs of spaced legs extending in parallel with respect to the respective signal flux paths, the two legs of each pair providing a loop magnetic circuit including at least one of the pole portions but excluding the associated gap, bias winding means coupled to said loop magnetic circuits to establish series saturating bias fluxes in the associated pole portions, common signal coupling means coupled to all of said cores in common and coupled to the two legs of each of said pairs in parallel for providing interlinkage between an electric signal circuit and each of said gaps, sweep generator means coupled to said loop magnetic circuits for providing a sweep current with a cyclically repeating current waveform and with the current waveform progressively changing during each cycle, and means whereby said sweep current is operative to successively desaturate the pole portions of the respective cores in succession in each cycle of said sweep generator means.

19. In combination, magnetic core means comprising a pair of separate magnetic core sections having respective magnetic pole portions defining therebetween a non-magnetic gap, at least one of said core sections comprising a closed loop continuous ferromagnetic circuit including the associated magnetic pole portion but excluding said gap and excluding the other of said magnetic core sections, means operative to establish a circulating flux in said closed loop continuous ferro-magnetic circuit of amplitude to place the associated magnetic pole portion in a saturated condition, and means selectively operative to oppose said circulating flux establishing means to place said magnetic pole portion in a non-saturated condition.

20. In combination, a magnetic core having a loop magnetic flux path including a pole portion and a gap for coupling the loop magnetic flux path with a magnetic record medium, said loop magnetic flux path having a pair of spaced legs of ferromagnetic material extending in parallel with respect to said loop magnetic flux path and the two legs together providing a continuous ferromagnetic circuit, signal winding means coupled to said loop magnetic flux path relatively remote from said gap, compensating winding means encircling said loop magnetic flux path and disposed relatively closer to said gap for generating a signal magnetomotive force in said loop magnetic flux path which is opposed with respect to the magnetomotive force of said signal winding means, and means for selectively saturating said legs of said continuous ferromagnetic circuit to relatively increase the effectiveness of said compensating winding means at said gap.

21. A magnetic transducer head comprising core means having a leg portion of reluctance which varies as a function of applied magnetomotive force, a bias winding encircling said leg portion for establishing a predetermined quiescent reluctance value for said leg, a control winding encircling said leg adjacent said bias winding for altering the net magnetomotive force applied to said leg, and shield means overlying a juncture between the bias and control windings for blocking leakage magnetomotive forces created between said bias winding and said control winding when the magnetomotive forces of the bias and control windings are opposed in said leg portion.

22. A magnetic recording head for recording a signal on a magnetic record medium comprising a pair of pole portions of magnetic material defining therebetween a gap for receiving a magnetic record medium, a pair of magnetic circuits connected to each of said pole portions and extending in spaced relation from each of said pole portions to define a substantially closed series magnetic circuit including each of said pole portions but excluding said gap, means for establishing circulating fluxes in said substantially closed magnetic circuit and through each of said pole portions adjacent said gap without crossing said gap, and means operating simultaneously with said circulating fluxes establishing means for establishing a magnetic signal flux at said gap between said pole portions varying in accordance with the signal to be recorded on the record medium.

23. A magnetic transducer head comprising a pair of magnetic pole pieces having confronting ends defining a gap for coupling to a magnetic record medium, a pair of magnetic circuits connected in parallel to each of said pole pieces and extending in substantially the same direction from each of said pole pieces in spaced generally parallel relation and defining a substantially closed series magnetic circuit including each of said pole pieces but excluding said gap, first winding means relatively closely adjacent said gap and linking said magnetic circuits in opposite effective winding directions for establishing circulating fluxes in said substantially closed series magnetic circuit including each of said pole pieces but excluding said gap, second winding means more remote from said gap than said first winding means and linking said magnetic circuits in the same effective direction with respect to said gap, and means for supplying an exciting current to the first winding means and a signal current to the second winding means simultaneously for producing circulating fluxes in said pair of magnetic circuits in series and for simultaneously producing a magnetic signal flux in said pair of magnetic circuits in parallel and for producing a signal field at said gap in accordance with a signal to be recorded on said record medium.

24. A magnetic transducer head comprising a pair of pole portions of magnetic material defining therebetween a gap for coupling to a magnetic record medium, a pair of magnetic circuits connected in parallel to each of said pole portions and extending in substantially the same direction from each of said pole portions in spaced generally parallel relation and defining a substantially closed series magnetic circuit including each of said pole portions adjacent said gap but excluding said gap, means for establishing circulating fluxes in said substantially closed series magnetic circuit and through each of said pole portions adjacent said gap, said magnetic circuits having respective spaced generally parallel legs, and common winding means directly linking both of said legs in the same effective winding direction with respect to said gap.

25. A magnetic transducer device comprising
 (a) a series of magnetic cores each having a signal flux path including coupling means for coupling the signal flux path to an external system and each having solid magnetic material extending continuously about a closed loop without any complete interruptions in said magnetic material about said loop to provide a loop magnetic circuit free of non-magnetic gaps,
 (b) first and second exciting electric circuits directly encircling said magnetic material of said loop magnetic circuit of each of said magnetic cores,
 (c) first and second sources of electronic current connected respectively to said first and second electric circuits of said magnetic cores and supplying respective current waveforms to said first and second electric circuits with at least one of said current waveforms cyclically varying with time and with at least one of said current waveforms producing magnetomotive forces in the respective cores with successively different amplitudes and with said current waveforms from said first and second sources being correlated to switch said cores in sequence to an active transducing condition in each cycle,
 (d) a transducing electric circuit coupled to each of said signal flux paths, and
 (e) means comprising the sequential switching of said cores for controlling a transducing operation between the transducing electric circuit and the respective coupling means of said cores.

26. A magnetic transducer device comprising
 (a) a series of magnetic cores,
 (b) first and second exciting electric circuits encircling each of said cores,
 (c) first and second sources of electric current connected respectively to said first and second electric circuits of said series of magnetic cores and supplying respective current waveforms to said first and second electric circuits with at least one of said current waveforms cyclically varying with time and with at least one of said current waveforms producing respective magnetomotive forces in the successive cores having successively different amplitudes and with said current waveforms being correlated to switch said cores in sequence to an active transducing condition in each cycle,
 (d) a transducing electric circuit in addition to said first and second exciting electric circuits coupled to each of said magnetic cores,
 (e) means comprising the sequential switching of said cores for controlling a transducing operation with respect to said transducing electric circuit, and
 (f) said first and second electric circuit of each magnetic core being in close proximity to produce substantially complete cancellation of the magnetic fields produced thereby during switching of the cores.

27. A magnetic transducer device comprising
 (a) a series of magnetic cores,
 (b) a graded electrical winding having successively different numbers of turns coupled to the respective cores of said series,
 (c) an exciting electric circuit coupled to each of said cores,
 (d) first and second sources of electric current connected respectively to said graded winding and said exciting electric circuit and supplying respective current waveforms thereto with said current waveforms being of cooperating configuration to switch said cores in sequence to an active transducing condition,
 (e) transducing electric circuit means coupled to each of said cores, and
 (f) means comprising the sequential switching of said cores for carrying out a transducing operation with respect to said transducing electric circuit means.

28. A magnetic transducer device comprising
(a) a plurality of groups of magnetic cores,
(b) respective common exciting electric circuits coupled to the magnetic cores of the respective groups with each common exciting electric circuit being coupled in common to all of the cores of one of said groups to produce an identical magnetomotive force waveform in each magnetic core of said group,
(c) means comprising electric current source means connected to said common exciting electric circuits for producing first and second magnetomotive force waveforms as a function of time in each of the cores of said groups of cooperating configuration to sequentially switch the cores of each group in succession to an active transducing condition,
(d) transducing electric circuit means coupled to said magnetic cores, and
(e) means comprising the sequential switching of the cores of the successive groups for carrying out a transducing operation with respect to said transducing electric circuit means.

29. A magnetic transducer device comprising
(a) a series of magnetic cores each comprising magnetic material providing a loop magnetic circuit with the circuits successively laterally offset and having respective pairs of legs in lateral alignment,
(b) electrically conductive ribbon winding means encircling the legs of the magnetic circuits with successively different numbers of turns,
(c) exciting electric circuit means coupled to said legs of each core,
(d) means comprising electric current source means connected to said ribbon winding means and to said exciting electric circuit means for producing first and second magnetomotive force waveforms in each leg of each core of cooperating configuration to switch the pair of legs of each core in succession to an active transducing condition,
(e) transducing electric circuit means coupled to each of said cores, and
(f) means comprising said loop magnetic circuits of said cores for controlling a transducing operation with respect to said transducing electric circuit means.

30. A magnetic transducer device comprising
(a) a series of magnetic cores each comprising magnetic material providing a loop magnetic circuit with the circuits successively laterally offset and having respective pairs of legs in lateral alignment,
(b) shielding members of electrically conductive non-magnetic material interposed between the successive cores and comprising leg members in lateral alignment with the legs of said loop magnetic circuits,
(c) electrically conductive ribbon winding means encircling the legs of the magnetic circuits with successively different numbers of turns,
(d) exciting electric circuit means coupled to said legs of each of said cores,
(e) means comprising electric current source means connected to said ribbon winding means and to said exciting electric circuit means for producing first and second magnetomotive force waveforms in each leg of each core of cooperating configuration to switch the pair of legs of each core in succession to an active transducing condition,
(f) transducing electric circuit means coupled to each of said cores, and
(g) means comprising said loop magnetic circuits of said cores for controlling a transducing operation with respect to said transducing electric circuit means.

31. A magnetic transducer device comprising
(a) a plurality of transducer head units for coupling to respective separate channels of a magnetic record medium,
(b) signal winding means coupled to each of said transducer head units for signal flux interlinkage with the respective corresponding channels of the record medium,
(c) means tending to produce an undesired flux interlinkage between at least a first of said head units and said record medium while another of said head units has a desired flux interlinkage with its associated channel of the record medium,
(d) compensating winding means coupled to each of said transducer head units,
(e) signal current electric circuit means connecting said signal winding means and said compensating winding means of said head units in an opposing sense such that said compensating winding means tends to reduce the effect of said undesired flux interlinkage between said record medium and said first of said head units during said desired flux interlinkage of said another of said head units with said record medium, and
(f) means for substantially limiting the relative effectiveness of said compensating winding means in opposing the effect of desired flux interlinkage between the record medium and the signal winding means as compared to its effectiveness in opposing the effect of said undesired flux interlinkage.

32. A magnetic recording head comprising
(a) a series of laterally offset magnetic head units each comprising a magnetic core having a pair of magnetic pole portions defining therebetween a non-magnetic gap,
(b) a magnetic tape record medium having a longitudinal dimension extending across said magnetic head units with the gaps of the head units adjacent and in coupling relation to respective laterally offset channels of the record medium,
(c) means for moving said magnetic tape record medium in the direction of said longitudinal dimension thereof to move the respective channels of the record medium across the respective head units while maintaining the channels of the record medium in coupling relation to the respective head units at said non-magnetic gaps thereof,
(d) the magnetic core of each head unit having a loop recording flux path extending through the pole portions thereof and through the magnetizable material of the associated channel of said record medium,
(e) at least one pole portion of each magnetic core having a continuous ferromagnetic circuit providing two legs in parallel with respect to said loop recording flux path,
(f) a recording winding coupled to said loop recording flux path of each core,
(g) a recording current source for supplying electric current to said recording winding for producing a magnetic recording flux in the loop recording flux path of each head unit which recording flux extends through the two legs of each head unit in parallel and which recording flux is effective to produce a recording on the corresponding channel of the record medium during an active condition of the head unit,
(h) first and second series of control windings encircling each leg of each head unit with at least said first series of control windings linking the legs of the successive head units with successively different numbers of turns, and
(i) first and second scanning control sources for supplying first and second control currents to said first and second series of control windings respectively of waveform to produce first and second control magnetomotive force waveforms in the continuous ferromagnetic circuits of the respective head units which first and second control magnetomotive force waveforms combine to provide net cyclically varying control magnetomotive force waveforms in the legs of the respective head units which net control magnetomotive force waveforms are of amplitude values during a major portion of each cycle corresponding to a magnetically saturated condition of the legs but which net control magnetomotive force waveforms in the legs of the respective head units sequentially pass through a zero amplitude value to sequentially place the head units in the active condition.

33. A magnetic playback head comprising
(a) a series of laterally offset magnetic head units each comprising a magnetic core having a pair of magnetic pole portions defining therebetween a non-magnetic gap,
(b) a magnetic record medium having a longitudinal dimension extending across said magnetic head units with the gaps of the head units adjacent and in coupling relation to respective laterally offset channels of the record medium,
(c) means for moving said magnetic record medium in the direction of said longitudinal dimension thereof to move the respective channels of the record medium across the respective head units,
(d) the magnetic core of each head unit providing a loop signal flux path for signal flux from the associated channel of the record medium which signal flux path extends through said pole portions of said core,
(e) at least one pole portion of each magnetic core having a continuous ferromagnetic circuit including two legs in parallel with respect to said loop signal flux path,
(f) a playback element coupled to said loop signal flux path of each head unit for producing an electric output signal in accordance with the signal flux variation at said element,
(g) first and second series of control windings encircling each leg of each head unit and each series having numbers of turns on the two legs of each head unit to provide balanced and opposed control magnetomotive forces with respect to the associated playback element but at least said first series of control windings linking the legs of the successive head units with successively different numbers of turns, and
(h) first and second scanning control sources for supplying first and second control currents to said first and second series of control windings respectively of waveform to produce said first and second control magnetomotive force waveforms in the continuous ferromagnetic circuits of the head units which first and second control magnetomotive force waveforms combine to provide net cyclically varying control magnetomotive force waveforms of amplitude values during a major portion of each cycle corresponding to a magnetically saturated condition of the legs but which net control magnetomotive force waveforms pass through a zero amplitude value to successively couple signal flux from the respective channels of the record medium to said playback elements of the respective head units.

34. A magnetic playback head comprising a core including a pair of pole portions defining a gap for coupling the core to a magnetic record medium and a pair of loop magnetic circuits each connected to the respective pole portions at its respective ends and being otherwise spaced from the other of said magnetic circuits throughout its length, means for establising circulating fluxes in said magnetic circuits and through said pole portions adjacent said gap but opposed with respect to said gap, output winding means linking said magnetic circuits, and an output circuit connected directly to said output winding means and responding directly to the frequency of the signal recorded on the record medium for producing an electrical output of the signal frequency without requiring demodulation of any frequency components produced by the circulating flux with said circulating fluxes establishing means establishing circulating fluxes of amplitude level of a value substantially at the toe of the initial magnetization curve for the material of said magnetic circuits.

35. In a magnetic scanning head, the combination of stacked laminations forming a base member and pole pieces extending away therefrom and having opposed pole faces defining a non-magnetic gap, the said pole pieces being composed of a plurality of laminations separated by non-magnetic spacers, each of said pole pieces being formed at the end which is contiguous to the base member so as to magnetically link portions of said base member to form a complete magnetic flux path within the said pole pieces and said base member, first winding means having turns linking certain of said laminations relatively proximately to one of said pole pieces such that the number of turns of said winding linking each of said certain laminations varies with its position in the stack, second winding means having turns linking certain of said laminations relatively proximately to the other of said pole pieces such that the number of turns linking each of said last named laminations varies with its position in the stack, whereby magnetic flux generated by energizing said windings is confined to a flux path within each of said pole pieces, respectively, and said base member, third winding means in inductive relation to both of said pole pieces and signal winding means in inductive relation to both of said pole pieces and said non-magnetic gap.

36. A magnetic scanning head comprising stacked magnetic laminations forming opposed poles separated by a non-magnetic gap, the said poles being formed of a number of magnetic sheets separated by non-magnetic spacers, and the said poles being connected by a laminated magnetic base member, each of said pole pieces being formed at the end opposite the said gap to magnetically link portions of said base member to form a complete magnetic flux path within said pole piece and said base member, said base member being magnetically coupled to said pole pieces to form a magnetic flux path through said pole pieces and said non-magnetic gap, first winding means inductively coupled with said base member and each of said pole pieces in such fashion that a linear magnetic potential drop is established across the stacked laminations when current flows through said first winding means, second winding means inductively coupled with said base member and said pole pieces for varying the distribution of the magnetic flux field in each of said laminations, and third winding means inductively coupled with said stack of laminations and said base member for causing a signal flux to flow through said stack of laminations along a path that includes said non-magnetic gap.

37. A scanning head comprising opposed poles formed from a plurality of interleaved magnetic and non-magnetic laminations, said poles being separated by a non-magnetic gap and the individual magnetic laminae of the poles being arranged in confronting relationship to form a plurality of recording gaps, a magnetic member magnetically coupled with said poles, each of said poles being formed at the point of contiguity with the said member to form a complete magnetic flux path within said pole piece and a portion of said magnetic member, said member including a plurality of stacked magnetic elements having openinsg to receive the turns of a plurality of first windings, said first windings being wound on said member in such fashion that a linear magnetic potential drop is established across said member increasing linearly outwardly from the center of said member, said linear magnetic potential drop being adapted to establish a saturated magnetic flux in all of said laminations in each of said poles except at a given location in said head, second winding means inductively coupled with both of said poles and said member for varying the distribution of the said saturating magnetic flux in all of said magnetic laminations, and third winding means inductively coupled with said poles and said member for causing a signal magnetic flux to flow through said poles and said magnetic member in a flux path that includes said recording gaps.

38. A scanning head comprising a plurality of stacked interleaved magnetic and non-magnetic laminations forming opposed poles separated by a non-magnetic gap, the magnetic laminae of said poles being arranged in confronting relationship to form a plurality of recording gaps, each of said poles being formed in a U shape at the end opposite that forming the non-magnetic gap adapted to be contiguous to the adjoining portion of a member so as to form a complete magnetic flux path through said member and within said pole, said member being made of laminated magnetic material and having a plurality of openings formed therein, first windings wound on said member and passing through said openings, said first windings being wound in such fashion that a maximum number of turns link the outer extremities of said member and the number of turns linking the remainder of said member decreases linearly in the direction of its center, said first windings being adapted to cause a linear magnetic potential drop to be established across said member when current flows therethrough to establish a saturating magnetic flux in said magnetic laminations within each of the said poles but not including said recording gaps, second winding means inductively coupled with said poles and said member for varying the distribution of said saturating magnetic flux with respect to each lamination of the said poles, and third winding means inductively coupled with said poles and member for establishing a signal magnetic flux in a magnetically unsaturated pair of said magnetic laminations along a flux path that includes a portion of said poles and the associated recording gap.

References Cited

UNITED STATES PATENTS

| | | | |
|---|---|---|---|
| 2,761,911 | 9/1956 | Camras | 179—100.2 |
| 2,785,233 | 3/1957 | Stuart | 179—100.2 |
| 2,807,676 | 9/1957 | Lynn | 179—100.2 |
| 2,608,621 | 8/1952 | Peterson | 179—100.2 |
| 2,855,464 | 10/1958 | Wiegard | 179—100.2 |
| 2,870,267 | 1/1959 | Duinker et al. | 179—100.2 |
| 2,955,169 | 10/1960 | Stednitz | 179—100.2 |
| 2,901,549 | 8/1959 | Serrell | 179—100.2 |
| 2,743,320 | 4/1956 | Daniels et al. | 179—100.2 |
| 2,618,709 | 11/1952 | Eckert et al. | 179—100.2 |
| 2,195,192 | 3/1940 | Schuller | 179—100.2 |
| 2,762,861 | 9/1956 | Somers | 179—100.2 |
| 2,893,906 | 5/1961 | Crane | 179—100.2 |
| 2,915,597 | 12/1959 | Wanlass | 179—100.2 |

FOREIGN PATENTS

| | | |
|---|---|---|
| 1,026,974 | 3/1958 | Germany. |

BERNARD KONICK, *Primary Examiner.*

L. M. ANDRUS, NEWTON N. LOVEWELL,
*Examiners.*

A. L. BRODY, D. G. REDINBAUGH, V. P. CANNEY,
*Assistant Examiners.*